US012037212B2

(12) United States Patent
Cere' et al.

(10) Patent No.: US 12,037,212 B2
(45) Date of Patent: Jul. 16, 2024

(54) MACHINE FOR TESTING EXTENSIBLE PLASTIC FILMS FOR PACKAGING

(71) Applicant: AETNA GROUP S.P.A., Verucchio (IT)

(72) Inventors: Mauro Cere', Verucchio (IT); Andrea Renzini, Verucchio (IT)

(73) Assignee: AETNA GROUP S.P.A., Verucchio (IT)

(*) Notice: Subject to any disclaimer, the term of this patent is extended or adjusted under 35 U.S.C. 154(b) by 888 days.

(21) Appl. No.: 17/052,984

(22) PCT Filed: May 24, 2019

(86) PCT No.: PCT/IB2019/054337
§ 371 (c)(1),
(2) Date: Nov. 4, 2020

(87) PCT Pub. No.: WO2019/229608
PCT Pub. Date: Dec. 5, 2019

(65) Prior Publication Data
US 2021/0107757 A1    Apr. 15, 2021

(30) Foreign Application Priority Data
May 28, 2018   (IT) .................. 102018000005787

(51) Int. Cl.
*B65H 26/02*   (2006.01)
*B65H 18/10*   (2006.01)
(Continued)

(52) U.S. Cl.
CPC .......... *B65H 26/02* (2013.01); *B65H 18/103* (2013.01); *B65H 23/188* (2013.01); *B65H 23/26* (2013.01);
(Continued)

(58) Field of Classification Search
CPC .... B65H 26/02; B65H 18/103; B65H 23/188; B65H 23/26; B65H 2511/112;
(Continued)

(56) References Cited

U.S. PATENT DOCUMENTS 3,674,221 A    7/1972  Riemersma
4,712,686 A *  12/1987 Lancaster ............. A01F 15/071
                                                 206/597

(Continued)

FOREIGN PATENT DOCUMENTS

CN        1271326     10/2000
CN      103950771      7/2014
(Continued)

OTHER PUBLICATIONS

International Search Report issued Jul. 23, 2019 in International (PCT) Application No. PCT/IB2019/054337.
(Continued)

*Primary Examiner* — Octavia Davis Hollington
(74) *Attorney, Agent, or Firm* — Wenderoth, Lind & Ponack, L.L.P.

(57) ABSTRACT

A testing machine to perform measurements and/or tests on a plastic film comprises a basic structure provided with a supporting plane, an unwinding station provided with an unwinding roller that supports a reel of film, a pre-stretching station arranged to unwind and to pre-stretch the film from the reel. The testing machine further comprises a wrapping station provided with a testing drum to be wrapped by the film coming out from the pre-stretching station, a plurality of measuring groups to perform measurements of dimensional and/or physical parameters of the reel and of the film, and a plurality of testing groups to perform respective tests and measurements on the film in order to determine mechanical and physical properties thereof.

32 Claims, 11 Drawing Sheets

(51) Int. Cl.
   *B65H 23/188* (2006.01)
   *B65H 23/26* (2006.01)
(52) U.S. Cl.
   CPC .. *B65H 2301/542* (2013.01); *B65H 2511/112* (2013.01); *B65H 2511/12* (2013.01); *B65H 2511/13* (2013.01); *B65H 2511/14* (2013.01); *B65H 2515/10* (2013.01); *B65H 2515/31* (2013.01); *B65H 2701/1944* (2013.01)
(58) Field of Classification Search
   CPC ............ B65H 2511/12; B65H 2511/13; B65H 2511/14; B65H 2515/10; B65H 2515/31; B65H 2701/1944; G01B 5/043
   See application file for complete search history.

(56) References Cited

U.S. PATENT DOCUMENTS

| | | | |
|---|---|---|---|
| 5,447,009 A | 9/1995 | Olesky et al. | |
| 6,102,313 A | 8/2000 | Salzsauler et al. | |
| 8,448,412 B2 * | 5/2013 | Cere | B65B 11/025 53/64 |
| 2009/0293425 A1 | 12/2009 | Carter et al. | |
| 2014/0033657 A1 * | 2/2014 | Cere' | B65B 11/00 53/461 |
| 2014/0123605 A1 * | 5/2014 | Cere' | B65B 11/025 53/461 |
| 2014/0217258 A1 * | 8/2014 | Cere' | B65B 11/025 104/118 |
| 2016/0229573 A1 | 8/2016 | Grassi et al. | |
| 2017/0101205 A1 | 4/2017 | Schieck et al. | |
| 2023/0049546 A1 * | 2/2023 | Ceré | B65B 51/16 |

FOREIGN PATENT DOCUMENTS

| | | | |
|---|---|---|---|
| CN | 203959451 | 11/2014 | |
| CN | 104609235 | 5/2015 | |
| EP | 0291483 B1 * | 11/1991 | ........... B65B 11/045 |
| EP | 2199215 A2 * | 6/2010 | ........... B65B 11/006 |
| EP | 3 070 003 | 9/2016 | |
| EP | 3109173 A1 * | 12/2016 | ........... B65B 11/025 |
| ES | 2875785 T3 * | 11/2021 | ............. B65B 11/02 |
| GB | 2222567 A * | 3/1990 | ........... A01F 15/071 |
| WO | 2015/040585 | 3/2015 | |
| WO | 2015/192250 | 12/2015 | |

OTHER PUBLICATIONS

Office Action issued Feb. 11, 2022 in corresponding Chinese Patent Application No. 201980036717.2, with English-language translation.

Office Action issued Aug. 19, 2022 in corresponding European Patent Application No. 19 733 138.2.

* cited by examiner

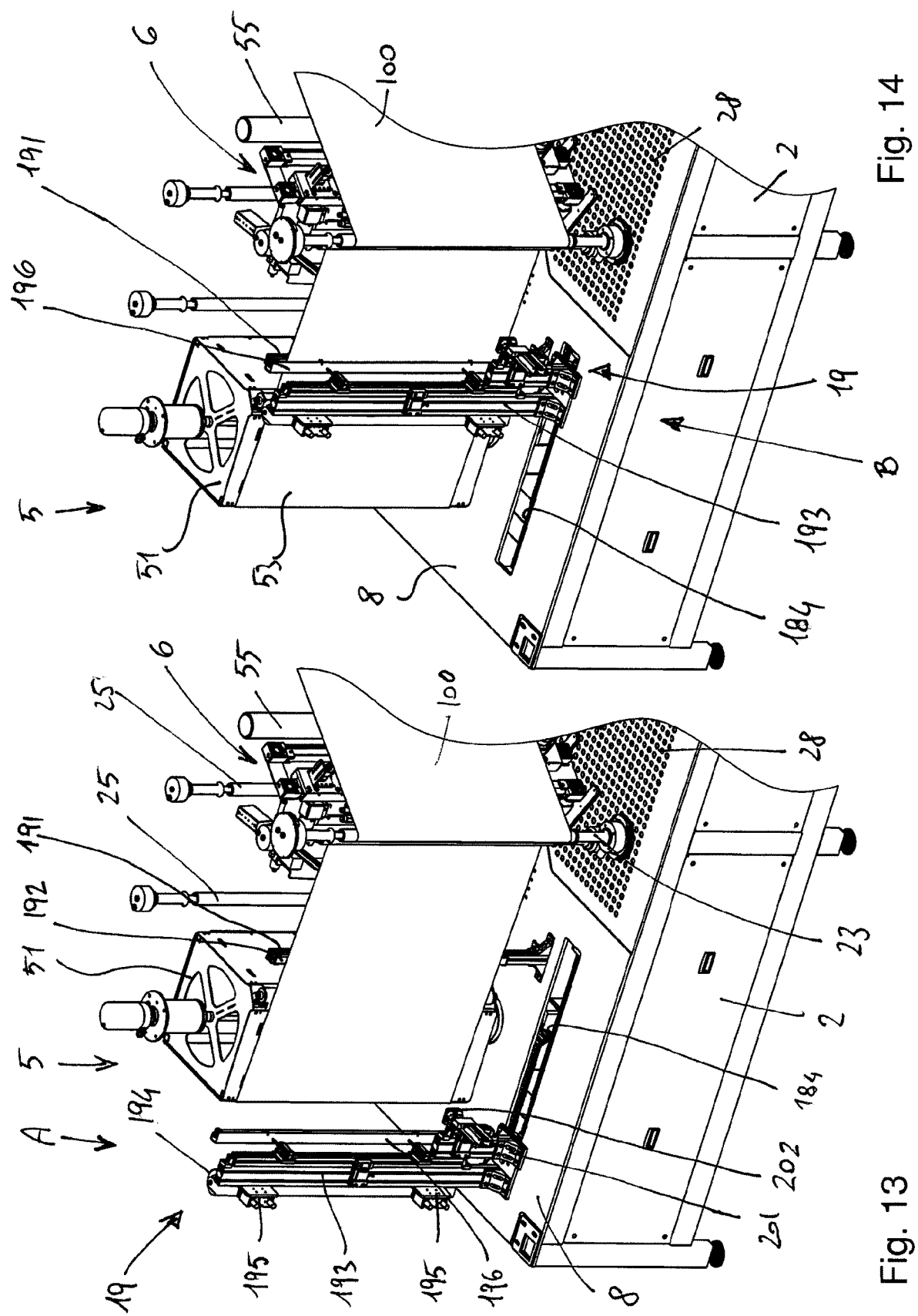

MACHINE FOR TESTING EXTENSIBLE PLASTIC FILMS FOR PACKAGING

The invention concerns machines and systems to examine and test films or wraps of extensible plastic material intended for manually or automatically wrapping objects, large packages, products grouped on pallets to form palletized loads. In particular, the invention refers to a testing machine able to perform a plurality of different measurements and tests on a cold extensible plastic film to determine the mechanic and physical characteristics necessary for its optimal use for packing, in particular for wrapping, palletized loads.

As known, films made of extensible plastic material are widely employed to wrap objects, large packages, products and the like, grouped and arranged, normally in overlapped layers, on pallets or platforms so as to form palletized loads. The plastic film wrapped on the load with an established wrapping force and generally pre-stretched or elongated does not only allow to protect products, objects, packs from dust, water, humidity, etcetera, but also to block them together and hence stabilize the load, enabling its movement and transport with no risk of damage or collapse.

The wrapping of palletized loads distributing the plastic film so as to form a plurality of film strips or bands overlapped and intertwined with a helix trend can be carried out manually or in a semi-automatic or automatic way by means of specific wrapping machines having different configuration and size.

In semi-automatic or automatic wrapping processes performed with wrapping apparatuses or machines, the plastic film is generally stretched or elongated, elastically and/or plastically, before being wrapped around the load.

Typically, the plastic film is elastically stretched of a pre-established quantity or percentage to be used at its best and to acquire mechanical and physical characteristics such as to make it more adapted to bear forces acting on the load in particular when it is moved and transported. More precisely, when the stretching force provided to the film to stretch it stops, the elastic return thereof determines a tightening force on the load that enables to hold and contain products composing it and fix the latter ones strongly to the underlying pallet. This containment and wrapping effect is also provided by the wrapping tension or force given to the film while being wrapped around the load and the possible adhesiveness of one of the two sides of the film, generally the inner one (cling side) which tends to stick (in some films due to the introduction of adhesive materials or of the composition with layers of low density polyethylene) to the underlying layer of film laid on the load.

The stretching or elongation or pre-stretching of the film is generally expressed in percentage as a ratio of the film elongation (difference between the final length of the stretched film and the original length) and the original length. Typically, elongation given to the film is between 50% and 400%.

The stretching or pre-stretching force further enables to reduce significantly the thickness of the film (typically from about 20-25 μm to about 6-7 μm) so as to increase proportionately its length in order to wrap a greater perimeter of load, the initial amount of unwound film being equal. This makes it possible to reduce film consumption and therefore the packaging costs.

The pre-stretching force also makes it possible to change the mechanical characteristics of the film thereof. The material of the latter, duly stretched, can, in fact, pass from an elastic behaviour, in which the film tends to return to its original dimension once the stress is over, to a plastic behaviour, in which the film undergoes a permanent deformation and does not return to its initial dimension once the stress is over. In this last case the film of plastic material acts like a flexible and inextensible element, similarly to a rope or a belt, and it can be used, for example, to wrap groups of unstable products that must be kept tightly fastened between them.

The plastic film unwound from a reel is generally stretched or elongated by means of a pair of pre-stretching rollers of the wrapping apparatus, such pair comprising a slow roller and a fast roller, respectively upstream and downstream with respect to a direction of movement of the film. Duly adjusting the difference between the rotation speeds of the two pre-stretching rollers, it is possible to stretch or elongate the film of a pre-established amount, according to an established pre-stretching or elongating percentage, before it is wrapped on the load. The film can be wrapped and engaged with pre-stretching rollers according to an "S" configuration or a "W" configuration. In the "S" configuration both sides (inner and outer) of the film adhere and wrap around the pre-stretching rollers while in the "W" configuration a return roller is interposed between the two pre-stretching rollers and only one side of the film adheres and wraps around pre-stretching rollers.

Wrapping processes of palletized loads with plastic film are, as known, particularly complex and difficult as non-optimal wraps can significantly affect the performance and behaviour of both packaging processes and packed loads. For example, a non-optimal wrapping can affect the stability of the palletized load, performance of the wrapping machine, expiry date of packed products, possible damages of packed products caused by the excessive contact forces between film and products, stability of products overlapped/stacked on the pallet, cause problems in automated transport and stocking of packed loads.

Non-optimal wrapping means using a plastic film with non-suitable physical and/or mechanical characteristics (thickness, density, adhesiveness, tensile, tearing strength, etcetera) and/or not properly stretched (insufficiently or excessively) and/or not properly wound (number of bands, band overlapping, wrapping force, etcetera) for the packaging of a palletized load.

In order to avoid such drawbacks, there is a need to find measurement and test methods that make it possible to characterize plastic films, i.e., to quantify their mechanical and physical properties such as to establish if and for which wrapping processes they are suitable in order to guarantee optimal performances and behaviours of wrapping processes and wrapped products. To this end, analysis and measurement procedures were developed to describe the film characteristics regardless of the implementation mode, the extrusion line, the production time and the composition of the film thereof.

International analysis and measurement standard procedures for the characterization of cold-extensible plastic films for packing palletized loads, for example, are being defined by the International Association EUMOS (European Safe Logistic Association). The "Stretch wrap film passport" ("Stretch wrap film passport"—EUMOS 40516) is a set of standards defined by EUMOS to perform respective measurements and tests on plastic films intended to be used in packaging/wrapping palletized loads.

The "force-stretching" standard (force-stretch relationship) defines a machine and method for measuring both the pre-stretch force, meaning the force for stretching the film between two pre-stretching rollers, and the wrapping force, meaning the force applied to the film when it is wrapped around the load, either forces being measured in relation to the film stretching and the feeding rate thereof.

The "force-position consistency" standard defines the measurement and calculation method to quantify the variations of the pre-stretch force and wrapping force along the film of a same reel.

The "cling measurement" standard describes a machine and method to measure the forces required to detach a layer of film wrapped on a load from a previous or underlying layer.

The "puncture resistance" standard describes a machine and method to measure the forces required to perforate the film.

The "tear resistance" standard describes a machine and method for measuring the resistance of a piece of perforated film to be completely torn.

The "unwinding parameters" standard describes a machine and method for measuring the forces required to unwind the film and the noise generated while being unwound.

The "specific parameters" standard describes a machine and method for measuring film parameters that are important for the different applications, as film transparency, presence of inclusions, colour evenness, etcetera.

These and other additional and complimentary tests are presently carried out only by qualified laboratories possessing machines and equipment suitable for performing the various tests and measure precisely and accurately the required physical magnitudes. These film characterization tests that are mainly carried out manually, or semi-automatic, by qualified personnel are thus particularly expensive and cannot be used or made available to plastic film manufacturers and/or film users.

An object of the invention is to improve the known machines and systems to analyse, measure and quantify the mechanical and physical properties of plastic films, in particular cold-extensible plastic films intended for packing and wrapping palletized loads.

Another object is to provide a testing machine that enables to perform substantially automatically, with a minimum manual action by operators, a plurality of measurements and tests on cold-extensible plastic films in order to establish its mechanical and physical characteristics required to be optimally employed for wrapping palletized loads.

One further object is to implement a compact, small-sized and cheap testing machine that makes it possible to perform precise and accurate measurements and tests on the film, and to collect, process and store relative data.

These and other objects of the invention are reached by a testing machine according to one of the following claims.

The invention shall be better understood and implemented referring to the enclosed drawings which illustrate one exemplary and non-limiting embodiment thereof, wherein:

FIGS. 13 and 14 are back perspective and partial views of the machine of the invention which illustrate one third testing group in two different operative positions;

Figure 1:
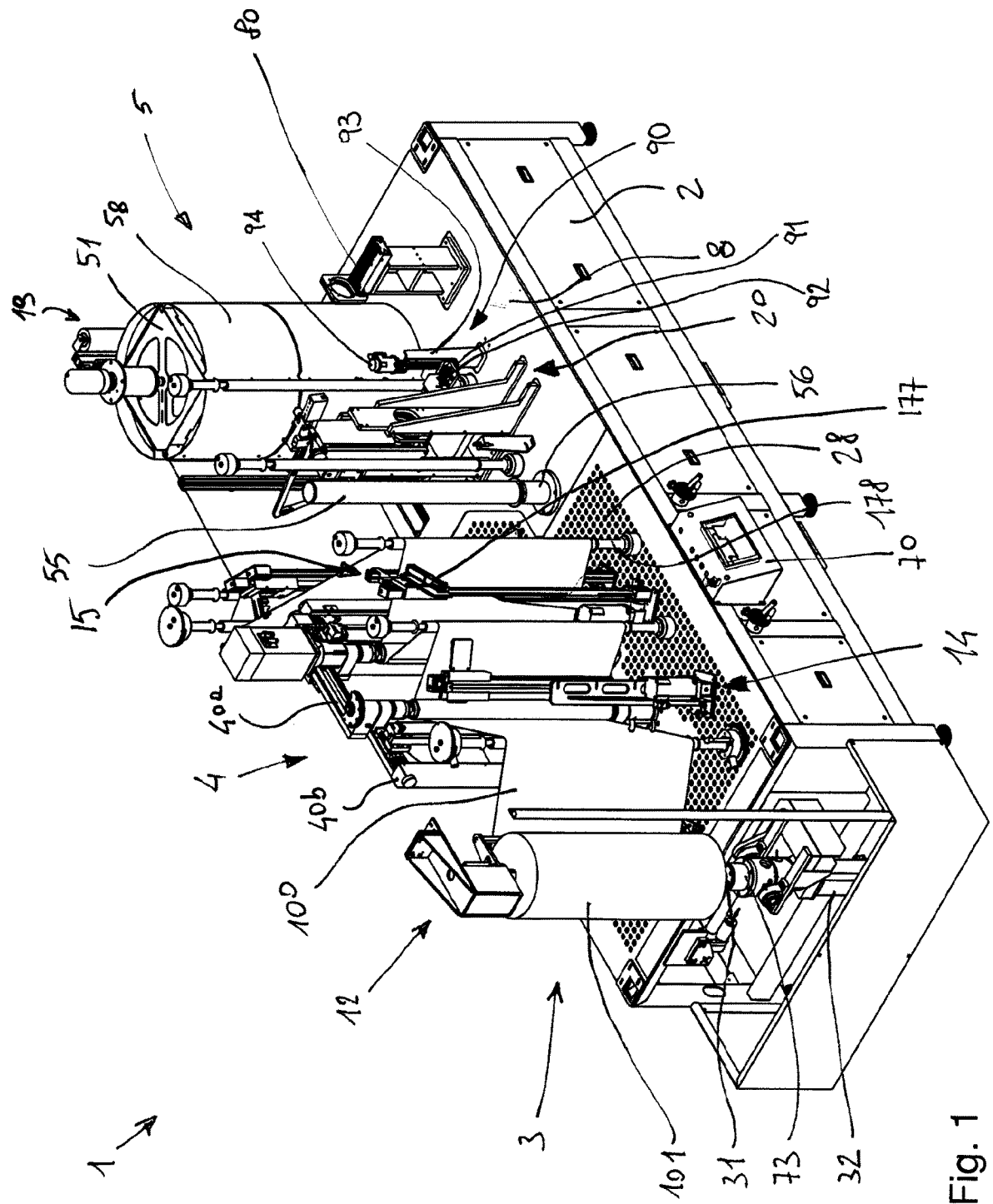
FIG. 1 is a front perspective view of the testing machine according to the invention associated with a film to be tested.
Figure 2:
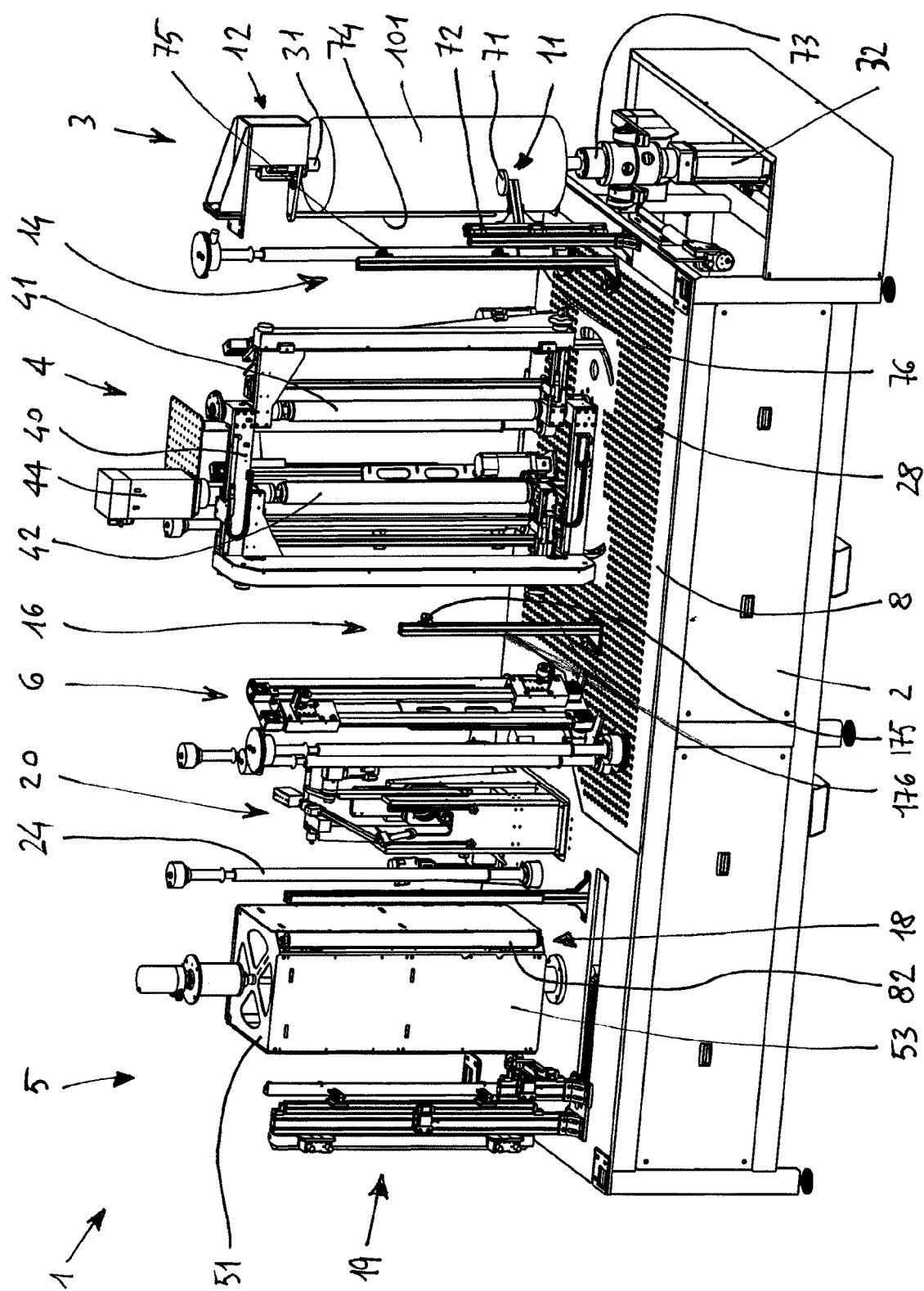
FIG. 2 is a back perspective view of the machine of FIG. 1 wherein the film has been removed.
Figure 3:
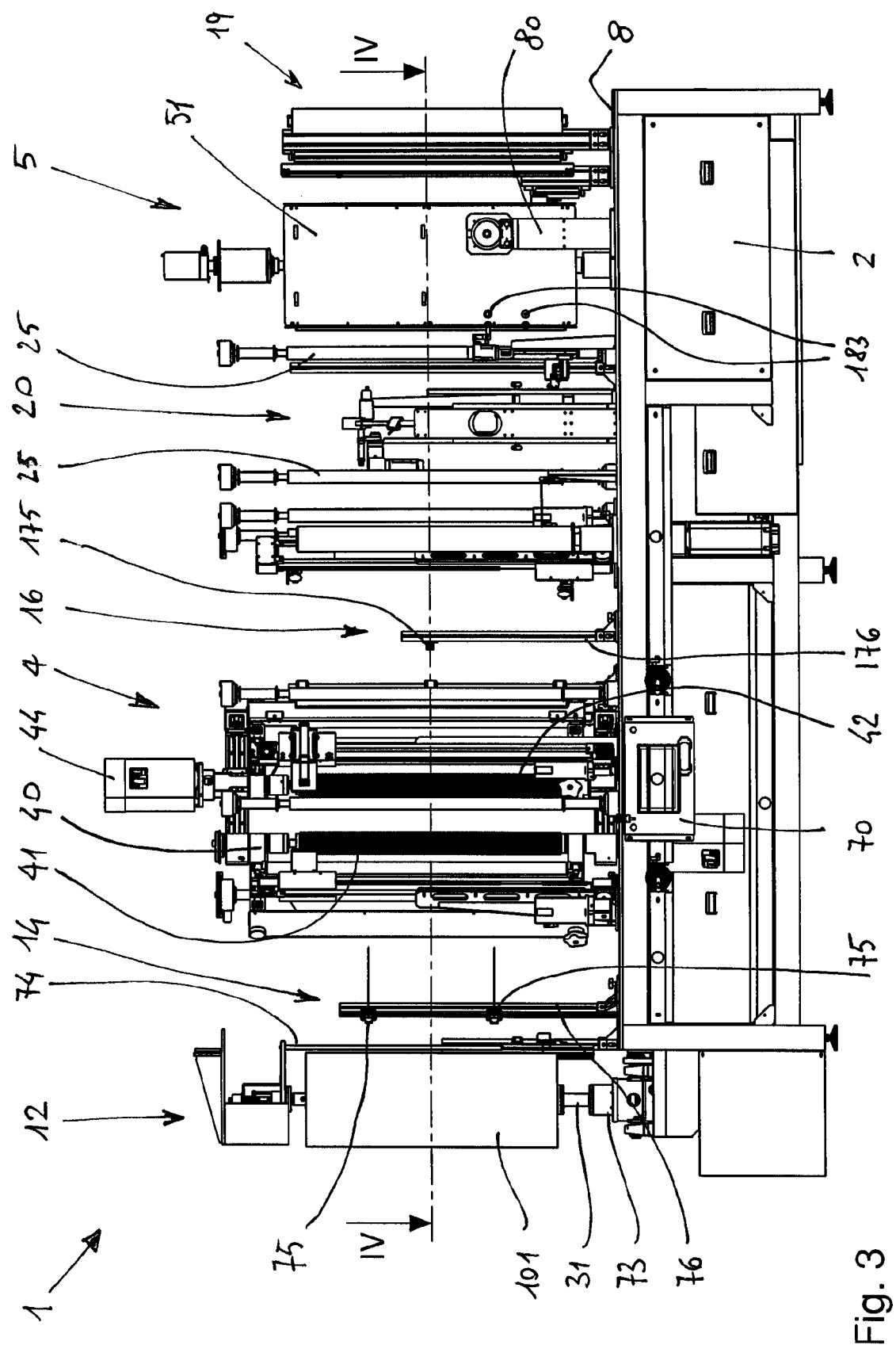
FIG. 3 is a front view of the machine of FIG. 2 with pre-stretching, return and guiding rollers arranged in a first operative configuration to unwind and stretch the film according to an "S" pre-stretching path.

Referring to FIGS. 1 to 16, it is illustrated a testing machine 1 according to the invention arranged to perform a plurality of measurements and tests on a film 100 made of plastics in order to determine its mechanical and physical properties. The film 100 is, for example, a cold-extensible plastic film of the type used to wrap and package objects, packs, products and the like grouped and arranged in overlapped layers, on pallets to make palletized loads.

Schematically, the testing machine 1 comprises a basic structure 2 provided with a supporting plane 8, an unwinding station 3, a pre-stretching station 4, a wrapping station 5, a plurality of measuring groups 11-16, a plurality of testing groups 17-20, and a plurality of guiding rollers 21-24.

The unwinding station 3 is provided with an unwinding roller 31 driven and/or controlled in rotation about a respective longitudinal axis, in particular almost orthogonal to the supporting plane 8, by a first driving system 32 and arranged to support a reel 101 of the film 100.

Figure 4:
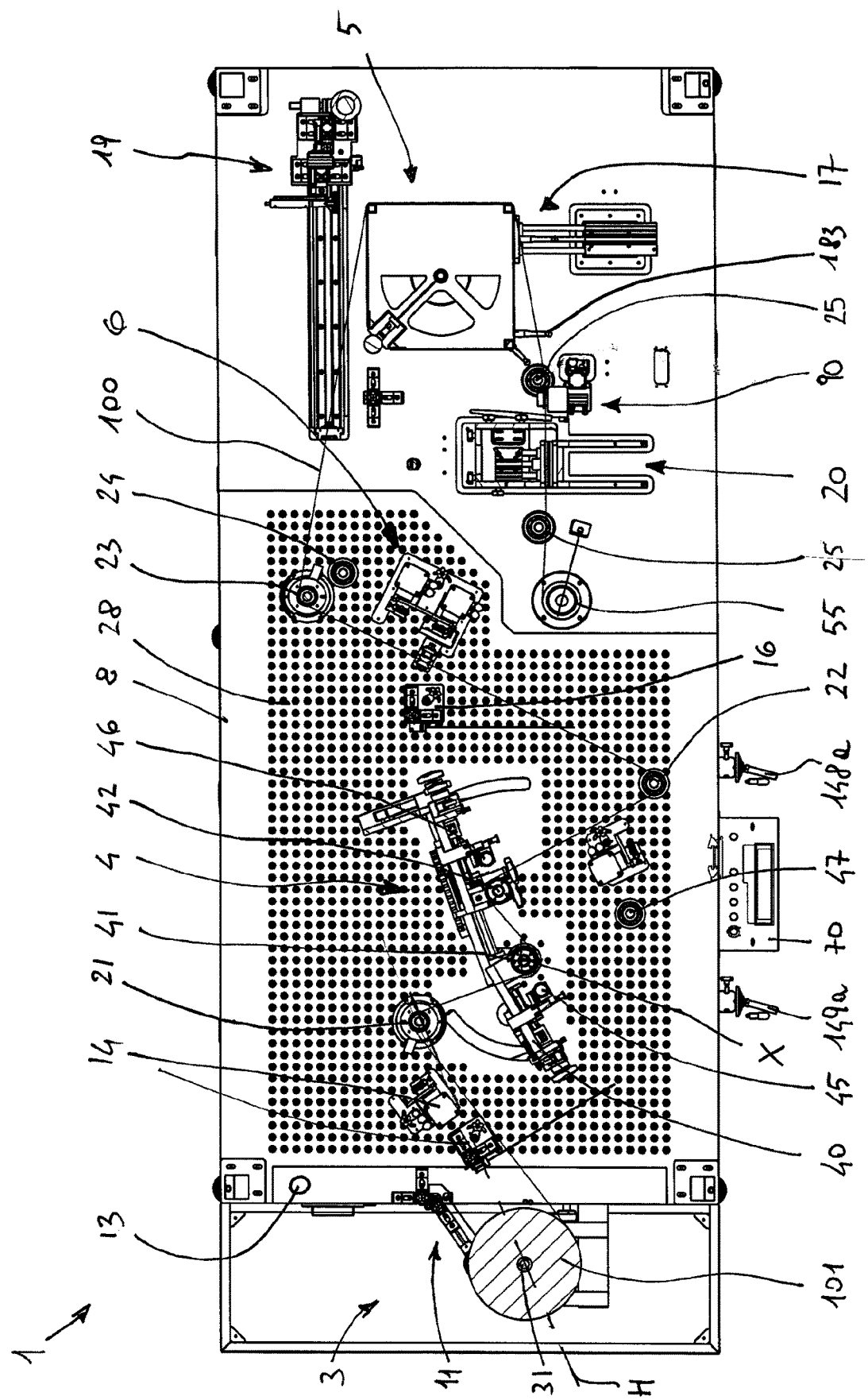
FIG. 4 is a plan view of the machine of FIG. 3.
Figure 5:
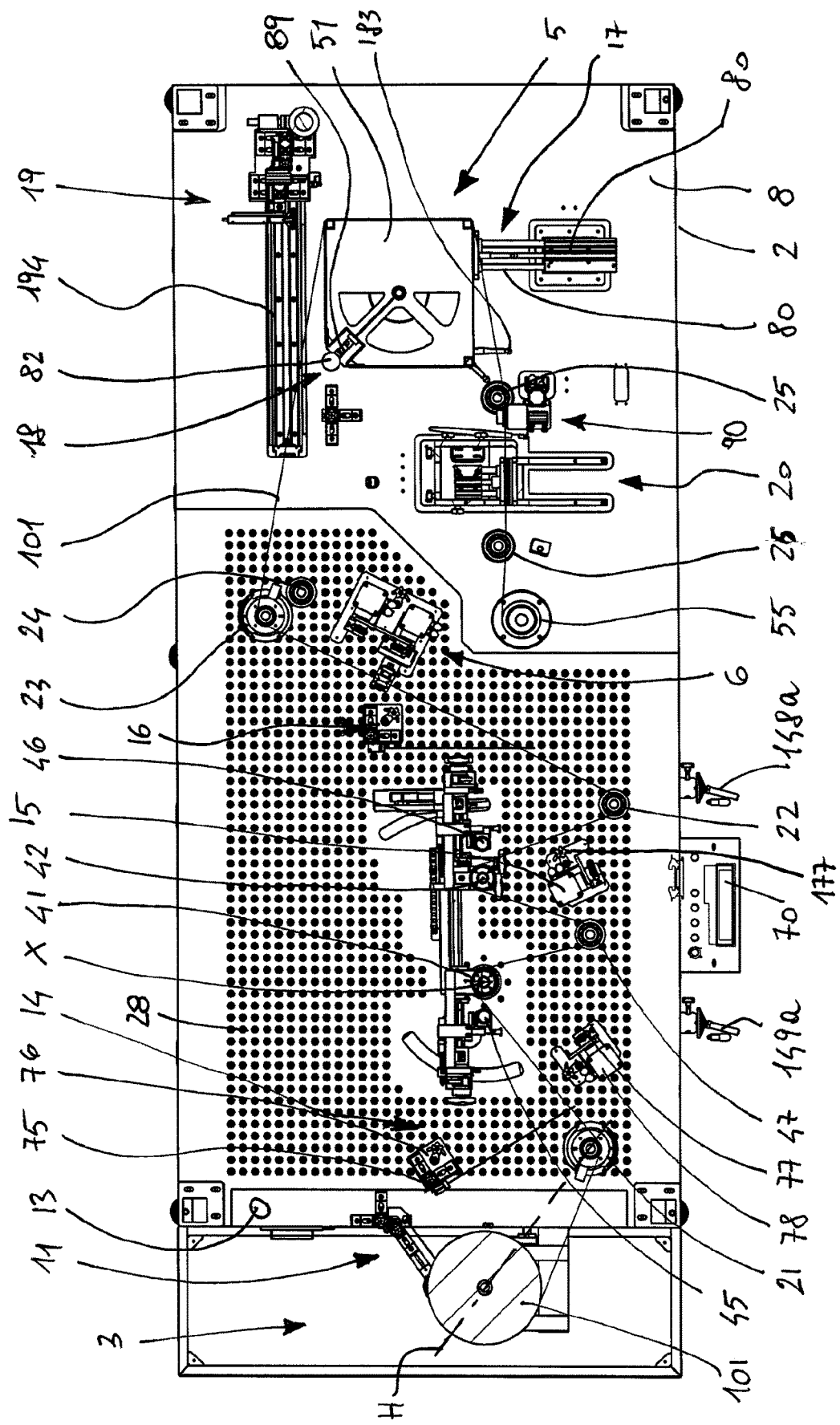
FIG. 5 is a plan view of the machine of the invention with pre-stretching, return and guiding rollers arranged in a second operative configuration to unwind and stretch the film according to a "W" pre-stretching path.

The pre-stretching station 4 is arranged to unwind the film 100 from the reel 101 with a preset unwinding speed and to pre-stretch the film 100 of a preset percentage and includes a couple of pre-stretching rollers 41, 42 driven to rotate about respective longitudinal rotation axis, in particular almost orthogonal to the supporting plane 8, by a second driving system 43, 44 and a plurality of return rollers 45, 46, 47, free to rotate about respective longitudinal axis and arranged to deviate and wrap the film 100 on pre-stretching rollers 41, 42 according to an "S" or a "W" pre-stretching path (FIGS. 4 and 5). In fact, pre-stretching rollers 41,42 and return rollers 45, 46, 47, apart from being interchangeable, for example with pre-stretching rollers and guiding rollers having different diameter, can be adjustably positioned to make it possible to change their relative position and therefore the film pre-stretching path.

The wrapping station 5 is provided with a testing drum 51 driven and/or controlled in rotation about a respective longitudinal axis, almost orthogonal to the supporting plane 8, by a third driving system 52 and arranged to be wrapped almost partially by the film 100 coming out from the pre-stretching station 4.

The measuring groups 11-16 are arranged to perform a plurality of respective measurements at least of dimensional and/or physical parameters of the reel and of the film and testing groups 17-20 are provided with respective means arranged to interact with the film and perform measurements and tests on the latter ones in order to determine and establish the mechanical and physical properties thereof. As better explained in the hereinafter description, means for interacting with the testing groups comprise, for example, punches, pressure rollers, return elements, buffers, cutting devices, etcetera.

The testing machine 1 is provided with a processing and control unit 70 arranged to receive and process data sent by measuring groups and testing groups in order to determine the mechanical and physical properties of the film 100 tested.

Guiding rollers 21-24, that are idle i.e. free to rotate about respective longitudinal axis, are arranged to lead the film 100 along a definite unwinding path from the unwinding station 3 to the pre-stretching station 4 and from the latter to the wrapping station 5. Guiding rollers 21-24 are interchangeable, for example with guiding rollers of different diameter, and can be reversibly and adjustably mounted to the supporting plane 8 to allow to change the unwinding path.

Displacement of the guiding rollers 21-24 is performed manually by an operator and the detection of the assembly position is carried out by the latter also manually with the aid of specific references present on the supporting plane 8.

The supporting plane 8 comprises a plurality of mounting holes 28 mutually spaced, in particular with a predetermined pitch and along two orthogonal directions such as to form an array of mounting holes 28 which makes it possible to reversibly and adjustably mount the guiding rollers 21-24.

The wrapping station 5 further comprises a device, of the known type and not illustrated in the figures, to load and unload the film reel 101 on/from the unwinding roller 31 The latter is driven in rotation by the first driving system 32 comprising, for example, a rotary electric motor of the brushless type, with excludable inner brake, to generate a counter torque. In alternative, the unwinding roller 31 can be controlled in rotation by the first driving system comprising an adjustable clutch with electric actuation/deactivation. The unwinding roller 31, which is fixed to the supporting plane 8, can be rotated in a clockwise or counter-clockwise direction to allow unwinding the reel 101 in both directions. Locking device is provided to lock on the unwinding roller 31 reels 101 with different height and/or diameters with or without centres or cores.

Figure 7:
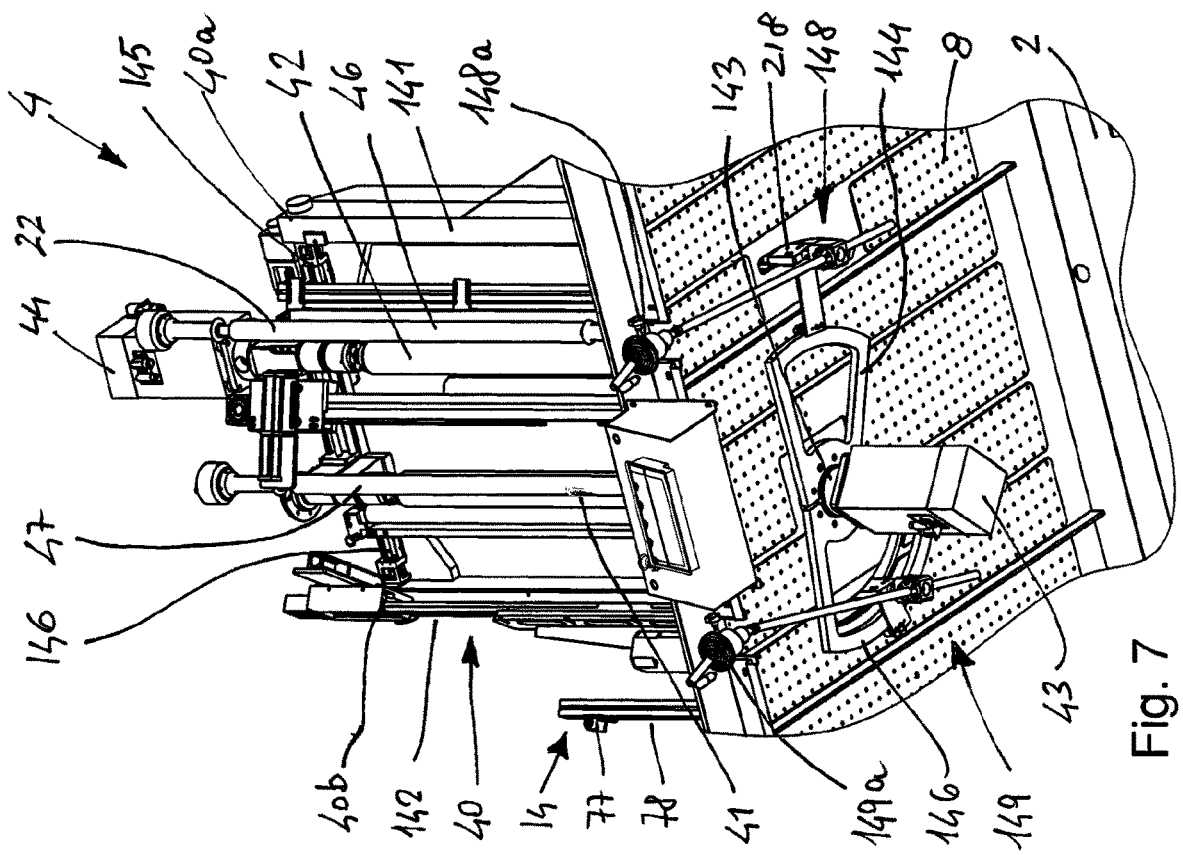
FIG. 7 is a perspective, enlarged and partial view from below, of the machine of the invention which illustrates the pre-stretching station.
Figure 6:
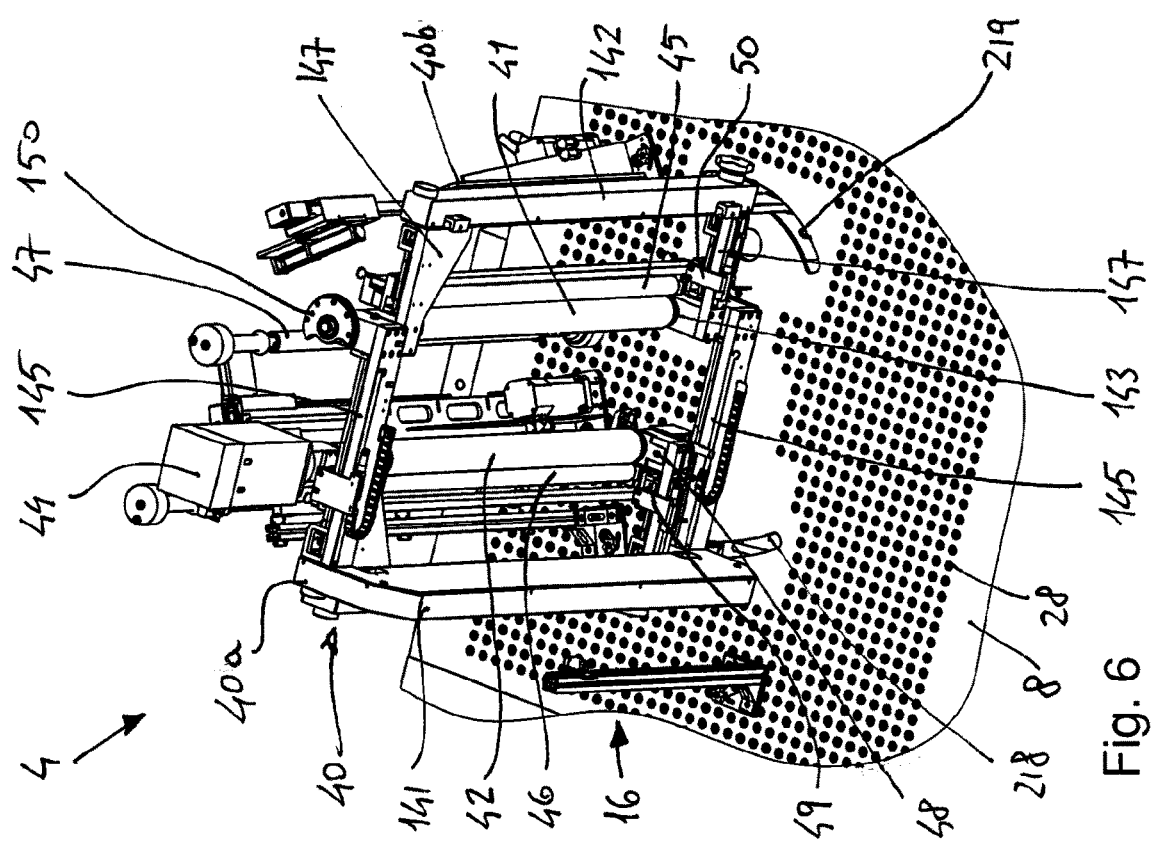
FIG. 6 is a perspective, enlarged and partial view from above, of the machine of the invention which illustrates a pre-stretching station.
Figure 8:
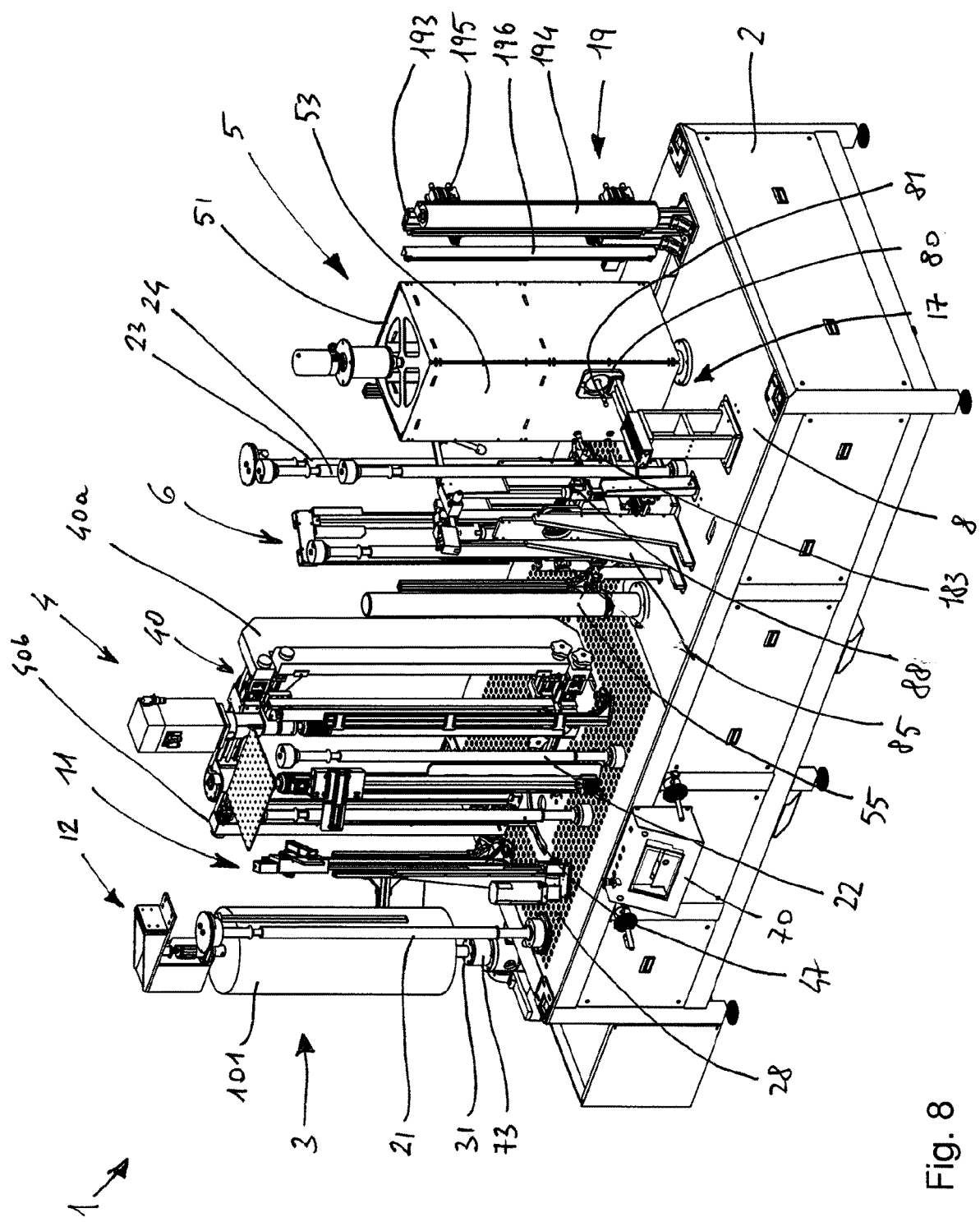
FIG. 8 is a front perspective view of a different angle of the testing machine according to the invention.
Figure 16:
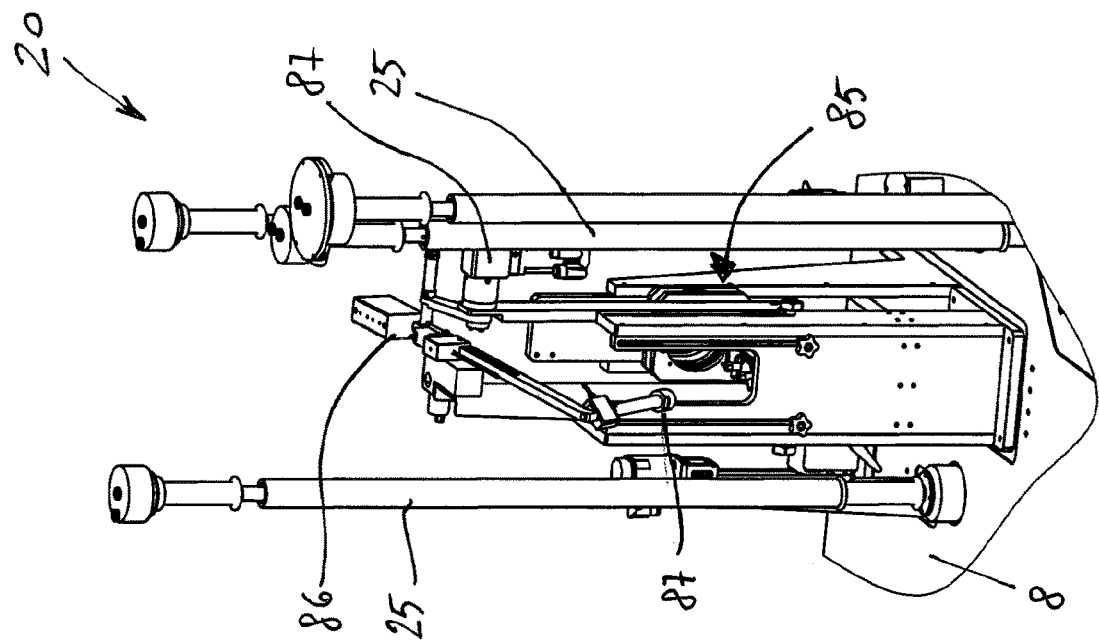
FIG. 16 is an enlarged perspective view of one fourth testing group of the machine of the invention.

Referring in particular to FIGS. 6 and 7, the pre-stretching station 4 comprises a main frame 40 connected to said supporting plane 8 and supporting rotatably and removably a first pre-stretching roller 41 (slow roller), and rotatably, removably and adjustably in position a second pre-stretching roller 42 (fast roller), a first return roller 45 and a second return roller 46. A third return roller 47 used in a second operative configuration of the pre-stretching station 4 to perform the "W" pre-stretching path is reversibly and adjustably fixed to the supporting plane 8 by means of the mounting holes 8 (FIG. 5).

The main frame 40 comprises a first portion 40a supporting said second pre-stretching roller 42 and said second return roller 46 and a second portion 40b supporting said first return roller 45, said portions 40a, 40b being rotatable about an adjusting axis X coinciding with the rotation axis of the first pre-stretching roller 41 such as to adjust an angular position of the second pre-stretching roller 42 and of the return rollers 45, 46 with respect to the first pre-stretching roller 41.

The first portion 40a of the main frame 40 is provided with a first supporting assembly 48 arranged to rotatably and removably support the second pre-stretching roller 42 (fast roller) and linearly movable with respect to the first portion 40a to allow to adjust the position of the second pre-stretching roller 42 with reference to the first pre-stretching roller 41. The first portion 40a of the main frame 40 is further provided with a second supporting assembly 49 arranged to rotatably and removably support the second return roller 46 and linearly movable with respect to the first portion 40a to allow to adjust a position of the second return roller 46 with reference to the second pre-stretching roller 42. The main frame 40 further comprises the second portion 40a of the main frame 40 provided with a third supporting assembly 50 arranged to rotatably and removably support the first return roller 45 and linearly movable with reference to the main frame 40 to make it possible to adjust a position of the first return roller 45 with reference to the first pre-stretching roller 41.

The main frame 40 with the two rotatable portions 40a, 40b and the supporting assemblies 48, 49, 50 allow to arrange the pre-stretching rollers 41, 42 and return rollers 45, 46 in a first operative configuration to perform an "S" wrapping path (FIG. 4) or a second operative configuration to perform a "W" wrapping path. More precisely, the main frame 40 makes it possible to displace the second pre-stretching roller 42 with respect to the first pre-stretching roller 41, linearly along an adjustment direction which joins the rotation axis of the two pre-stretching rollers 41, 42, and angularly by varying the angle of the aforesaid adjustment direction with respect to the rotation axis of the first pre-stretching roller 41. Furthermore, the main frame 40 makes it possible to adjust a relative position of the first return roller 45 with respect to the first pre-stretching roller 41 and of the second return roller 46 with respect to the pre-stretching roller 42 to modify the film 100 wrapping on the pre-stretching rollers 41, 42 or in case of contact to limit slippage of the film on the aforesaid pre-stretching rollers.

In the illustrated embodiment, the main frame 40 comprises, for example, a first portion 40a formed by a first upright 141 connected to a central hub 143 of the main frame 40 by means of a first connecting element 144 arranged under the supporting plane 8 and a pair of first crossbars 145 arranged parallel and spaced above the supporting plane 8. The first upright 141 is connected with the first connecting element 144 by means of a respective shaped slot 218, arc-shaped, made on the supporting plane 8. First crossbars 145 support the second pre-stretching roller 42 and the second return roller 46. The central hub 143 is fixed to the supporting plane 8 and supports the first pre-stretching roller 41 and the relative driving motor of the second driving system 43, 44.

A first screw-movement system 148 with crank manual control 148a makes it possible to rotate the first portion 40a of the main frame 40 about the adjusting axis X to vary angularly the position of the second pre-stretching roller 42 and of the first return roller 45 with respect to the first pre-stretching roller 41.

The first supporting assembly 48 comprise respectively first carriages slidably connected to first crossbars 145 and supporting the second pre-stretching roller 42 and the relative driving motor of the second driving system 43, 44. The first carriages of the first supporting assembly 48 are linearly movable along the first crossbars 145, such as to adjust the distance between the two pre-stretching rollers 41, 42. Adjusting the position of the second pre-stretching roller 42 is carried out manually or by means of a respective actuator.

The second supporting assembly 49 comprise respective second carriages slidably connected to first crossbars 145 and rotatably supporting the second return roller 46.

The second carriages of second supporting assembly 49 are adjustably connected to the first carriages of the first supporting assembly 48 such as to move with the latter ones and with the second pre-stretching roller 42. The position of the second carriages is further and independently adjustable along the first crossbars 145 to allow to adjust the position of the second return roller 46 linearly with respect to the second pre-stretching roller 42. Adjusting the position of the second return roller 46 is carried out manually or by means of a respective actuator.

The main frame 40 further comprises a second portion 40b formed by a second upright 142 connected with the central hub 143 by means of a second connecting element 146 arranged under the supporting plane 8 and a pair of second crossbars 147 arranged parallel and spaced above the supporting plane 8. The second crossbars 147 support the first return roller 45.

The second upright 142 is connected with the second connecting element 146 by means of a respective shaped slot 219, arc-shaped, made on the supporting plane 8.

The lower first uprights 145 and second uprights 147, i.e. adjacent to the supporting plane 8, are rotatably connected to one another by means of the central hub 143, while the upper first crossbars 145 and second crossbars 147, i.e. more distant from the supporting plane are rotatably connected to one another at an upper end of the first pre-stretching roller 42 by means of a hinge 150.

A second screw-movement system 149 with crank manual control 149a makes it possible to rotate the second portion 40a of the main frame 40 about the adjusting axis X to vary angularly the position of the first return roller 45 with respect to the first pre-stretching roller 41.

The third supporting assembly 50 comprise respective third carriages that are slidably connected with the second crossbars 147 of the second portion 40b of the main frame 40 and rotatably support the first return roller 45. The position of the third carriages of the third supporting assembly 50 can be adjusted along the second crossbars 147 to allow to adjust the position of the first return roller 45 linearly with respect to the first pre-stretching roller 41. Adjusting the position of the first return roller 45 is carried out manually or by means of a respective actuator.

Respective elastic systems, in particular spring systems, manually excludable, are provided to push the first and the second return rollers 45, 46 to abut against respective pre-stretching rollers 41, 42 with a definite contact force or pressure.

The position of the second pre-stretching roller 42 and the positions of the first and second return rollers 45, 46 are detected and measured by proper position sensors.

The pre-stretching rollers 41, 42 can be easily removed and replaced by other pre-stretching rollers having different diameters and/or height and/or different external coating to perform different tests on the film. Similarly, the return rollers 45, 46, 47 can be easily removed and replaced by other pre-stretching rollers having different diameters.

The second driving system comprises, for example, a first electric rotary brushless-type motor 43 and a second electric rotary brushless-type motor 44, both provided with excludable brakes, acting respectively on the first pre-stretching roller 41 and on the second pre-stretching roller 42.

A first guiding roller 21 is positioned between the wrapping station 3 and the pre-stretching station 4, arranged to receive the film 100 being unwound from the reel 101 and deviate it towards the first return roller 45 or the first pre-stretching roller 41 of the pre-stretching station 4. The first guiding roller 21 is reversibly and adjustably mounted on the supporting plane 8 by means of a support provided with a load cell, or other force sensor, such as to detect a force exerted by the film 100 on such roller at the entrance of the pre-stretching station 4 i.e. to measure a force of wrapping tension of the film, as better explained in the hereinafter description.

A second guiding roller 22 is placed downstream of the pre-stretching station 4 to receive the film coming out from the latter and deviate it to a subsequent third guiding roller 23 and it is mounted on a support provided with a load cell or other force sensor such as to detect a wrapping force exerted by the film 100 while unwinding and pre-stretching, i.e. a wrapping tension of the film 100.

The third guiding roller 23 is reversibly and adjustably mounted on the supporting plane 8 by means of a respective support provided with a load cell, or other force sensor, such as to detect a force exerted by the film 100 on this roller, i.e. to measure a force or wrapping tension of the film coming out from the pre-stretching station 4.

A fourth guiding roller 24 is reversibly and adjustably positioned on the supporting plane 8 and is arranged to deviate the film 100 wrapped and coming from the third guiding roller 23 towards the testing drum 51 of the wrapping station 5.

The testing drum 51, also called instrumented drum, has a squared-plan section, for example with a side of 500 mm, and it is rotated about the respective longitudinal axis by the third driving system 52 comprising for example a respective electric rotary brushless-type motor provided with an excludable brake. The testing drum 51 can be rotated in a clockwise or counter clockwise direction to make it possible to wrap the film 100 in both directions.

Four half-circular elements 58 can be applied to the testing drum 51 to implement a cylindrical drum with substantially constant radius. A manual locking device is provided on a side of the testing drum 51 to block the film 100.

The wrapping station 5 also comprises a wrapping roller 55 driven and/or controlled in rotation about a respective longitudinal axis, in particular almost orthogonal to the supporting plane 8, by a fourth driving system 56 and arranged to receive and be wrapped by the film 100 coming out from the testing drum 51. In particular, the wrapping roller 55 supports and rotates a centre or core around which the film is wrapped such as to form a wrapping reel. The wrapping roller 55 is rotated by the fourth driving system 56 comprising, for example, a respective electric rotary brushless-type motor. A system, of the known type and not illustrated in the figures, is provided to unload the reel wrapped with the film from the wrapping roller 55 and to change the centre or core of a new reel.

Additional guiding rollers 25, for example two, are interposed between the testing drum 51 and the wrapping roller 55 to deviate towards the latter the film 100 being unwound from the testing drum 51. Additional guiding rollers 25 are fixed to the supporting plane 8.

The testing machine 1 further comprises a film neck-in group 6 which is placed between the pre-stretching station 4 and the wrapping station 5 and arranged to shrink a strip width of the film 100, possibly rolling, as a rope, at least one of the longitudinal edges of the film 100. The film neck-in group 6 is reversibly and adjustably mounted on the supporting plane 8 depending on the film unwinding path, in particular it can be connected by means of the array of holes 28 of the aforesaid supporting plane 8.

Figure 11:
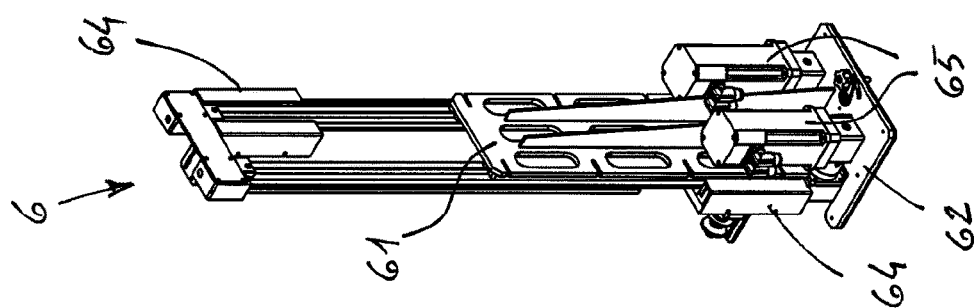
FIGS. 10 and 11 are respectively front and back enlarged perspective views of a film neck-in group.
Figure 10:
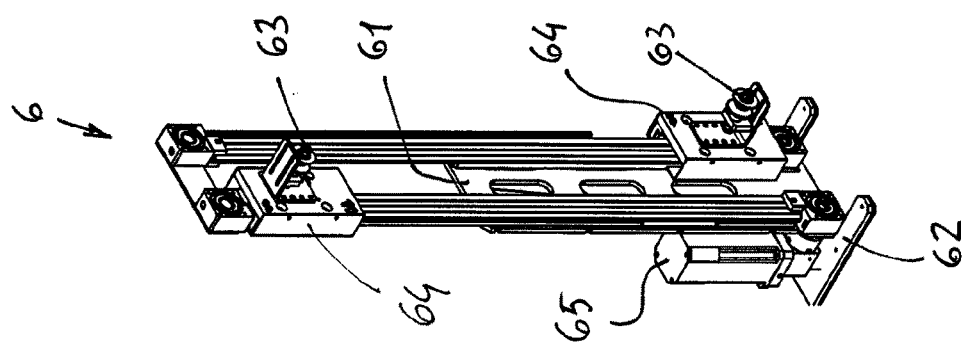

As better illustrated in FIGS. 10 and 11, the film neck-in group 6 comprises a first supporting column 61 provided with a base 62 for connecting it to the mounting holes 28 and slidably supporting a pair of rolls 63 free to rotate around respective longitudinal axis substantially orthogonally to the first supporting column 61 and parallel to the supporting plane 8. The rolls 63 are mounted on respective carriages 64 moved independently along the first supporting column 64 by a fifth driving system 65, comprising for example two respective rotary electric brushless-type motors and motion-conversion systems comprising screw-nut screw groups, or groups with pulleys and belt, of the known type and not illustrated in the figures. Rolls 63 are shaped such as to abut against and fold film longitudinal edges to reduce the strip width thereof.

The testing machine 1 according to claim 1 comprises a first measuring group 11 arranged in the unwinding station 3 and adjacent to the reel 101 to measure the length of film 100 unwound from the reel 101 and/or a diameter of the reel 101. The first measuring group 11 comprises for example a measuring wheel 71 provided with an encoder and fixed to an oscillating shaft leaning against the reel 101 and able to measure the length of film unwound and an ultrasonic sensor 72 to measure the diameter of the reel 101 while being unwound.

In the unwinding station 3 and at the reel 101, a second measuring group 12 is also provided that is adapted to measure the weight of the reel 101 and/or an angle formed by the film 100 unwound from the reel 101 with a vertical plane H passing through the longitudinal axis respectively of the reel 101 and of the first guiding roller 21, placed between the unwinding station 3 and the pre-stretching station 4. The value of the angle formed by the film 100 is used by a processing and control unit of the machine 1 for calculating, starting from force data detected by the load cell of the first guiding roller 21, an unwinding force or tension of the film 101 unwound from the reel 101, i.e. a force with which the film is stretched or pulled before it enters into the pre-stretching station 4.

The second measuring group 12 comprises a respective load cell or balance 73 associated with the unwinding roller 31 and able to measure the weight of the reel and an oscillating arm 74 leaning against the film provided with an encoder to measure the rotation angle.

A third measuring group 13 is provided to measure a level of noise generated by the unwinding station 3 and pre-stretching station 4 while unwinding the film 100. The third measuring group 13 comprises a noisiness sensor or phonometer fixed to the supporting plane 8 or to a cover upper part, not illustrated, of the base structure 2 of the machine 1.

A fourth measuring group 14 is provided to measure the height of the reel 101 i.e. an initial width of the film 100 and a neck-in of such width of the film 100 coming out from the reel 101 during the functioning. The fourth measuring group 14 further measures a thickness of the film 100 coming out from the reel 101 and before pre-stretching in the pre-stretching station 4.

The fourth measuring group 14 comprises one or more first viewing sensors 75, for example two and comprising respective first array photo cameras, positioned between the unwinding roller 31 and the first guiding roller 21 and able to acquire and send to the processing and control unit 70 the value of the initial width of the film 100 stretched between the rollers 31, 21 and/or a position of lower longitudinal edge and/or an upper longitudinal edge of the film 100 with respect to a reference plane, before starting each test and thus before any possible deformation of the film 100 itself. The same first viewing sensor 75, during normal functioning, detects and measures the neck-in of the film at the reel 101 exit. The first viewing sensors 75 are supported and fixed to the supporting plane 8 by means of a second supporting column 76 along which it can be manually adjusted in position.

Figure 9:
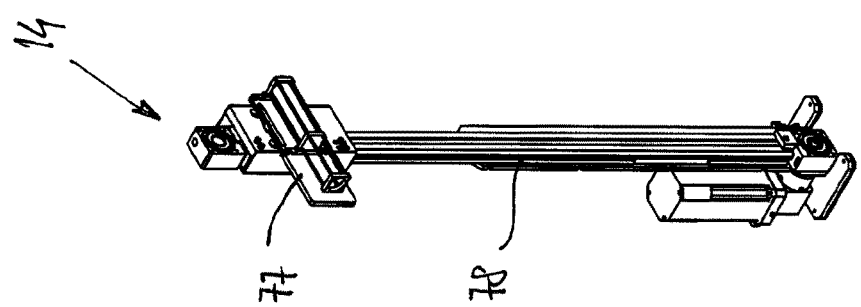
FIG. 9 is an enlarged perspective view of a fourth measuring group of the machine of the invention.

A first thickness sensor 77 of the fourth measuring group 14 detects and measures a thickness of the film 100 at the reel 101 exit. The first thickness sensor 77, for example of interferometric type, is supported and fixed to the supporting plane 8 by means of a third supporting column 78 and it is adjustable in height along the latter by means of a respective actuator, for example of electric type (FIG. 9).

The viewing sensor 75 and the first thickness sensor 77 are reversibly and adjustably fixed on the supporting plane 8 according to the unwinding path P of the film, in particular the respective supporting columns 76, 78 can be connected to the supporting plane 8 using the mounting holes 28.

A fifth measuring group 15 is provided to measure the thickness of the film 100 coming out from the pre-stretching station 4. Said fifth measuring group 15 comprises a second thickness sensor 177 supported and fixed to the supporting plane 8 by means of a fourth supporting column 178 and adjustable in height along the latter through a respective actuator, for example of electric type. In this case also, the second thickness sensor 177 is reversibly and adjustably fixed to the supporting plane 8 according to the unwinding path P of the film, in particular the fourth supporting column 178 can be connected to the supporting plane 8 using mounting holes 28.

A sixth measuring group 16 is provided downstream of the pre-stretching station 4 to measure a width neck-in of the film 100 and/or a position of a lower longitudinal edge and/or of an upper longitudinal edge of the film 100 with respect to a reference plane and to detect possible flaws and/or imperfections of the film 100. The sixth measuring group 18 comprises a second viewing sensor 175, for example a second array photo camera, which is placed between the second guiding roller 22 and the third guiding roller 23 and it is able to acquire and send to the processing and control unit 70 the value of the width of the film 100 and/or a position of the lower longitudinal edge and/or of an upper longitudinal edge of the film 100 after pre-stretching and at the same time to perform a quality test of the film, i.e. to detect the presence of possible flaws and/or imperfections in the latter, such as holes, tears, lumps, unevenness, foreign bodies, etcetera. The second viewing sensor 175 is reversibly and adjustably fixed to the supporting plane 8, by means of a fifth supporting column 176 along which it can be manually adjusted in position, according to the unwinding path of the film 100, in particular using the mounting holes 28.

The measuring groups 11-16 of the testing machine 1 of the invention thus allow to perform a plurality of measurements at least of dimensional and/or physical parameters of the reel and of the film and more precisely they allow, in particular with no need of interventions by operators, to detect and measure one or more dimensional and/or physical parameters of the reel 101 and film 100, such as a length of the film 100 unwound from the reel 101, a diameter and a weight of the latter, an angle formed by the film 100 unwound from the reel and directed to the pre-stretching station 4, a width and/or a width neck-in and/or a thickness of the film 100 coming out from the unwinding station 3 before and after the pre-stretching station 4. The measuring groups 11-16 also allow to detect the presence of possible flaws and/or imperfections on the film, to measure a level of noise generated in the machine during the unwinding of the film 100.

The testing machine 1 of the invention comprises a first testing group 17 to perform a puncture test on the film 100 and/or a measurement of a first retention force of the film 100 wrapped on the testing drum 51, a second testing group 18 to perform a measurement of a second retention force of the film 100 wrapped on the testing drum 51, a third testing group 19 to perform on the film 100 a cling test and/or a test for detecting a friction coefficient and a fourth testing group 20 to perform on the film 100 a dart test of the film 100 and/or a test of resistance to tearing and/or a test for detecting an elastic recovery of the film 100.

Figure 12:
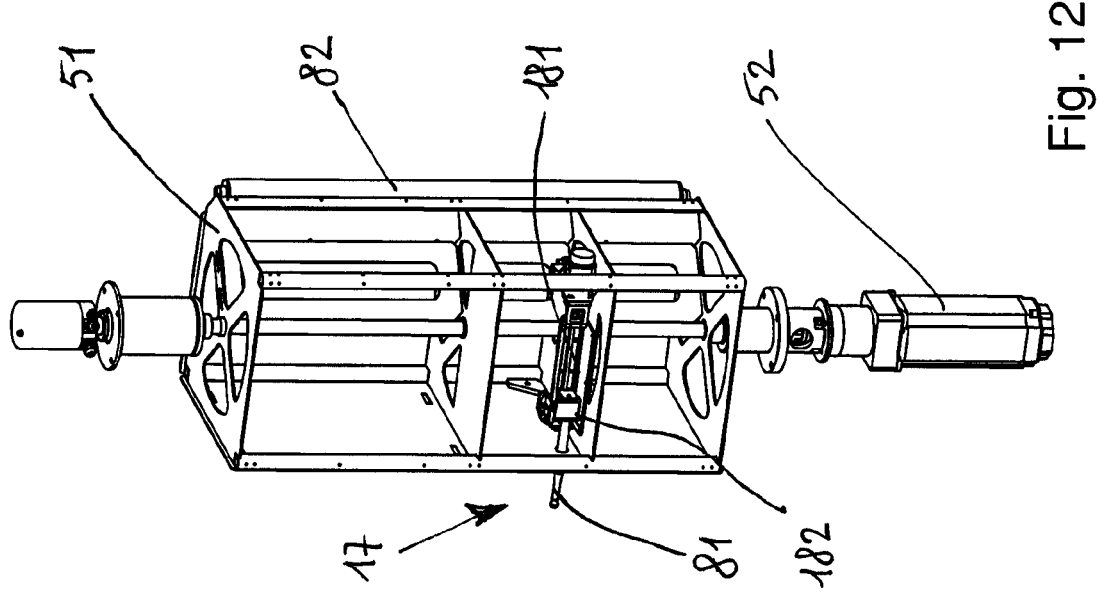
FIG. 12 is an enlarged view of a testing drum of a wrapping station of the machine of the invention.

The first testing group 17 comprises a first punch 81, interchangeable, housed inside the testing drum 51 and linearly movable while protruding from one of the four sides 53 of the latter by means of a first linear actuator 181, for example of electric type (FIG. 12). A load cell 182 is interposed between the first punch 81 and the first actuator 181 to measure a force exerted by the first punch 81 on the film 100 to perforate the latter during the puncture test or a wrapping or retaining force exerted by the film on the first punch 81 during the retention test. The first punch 81 can be easily removed and replaced with punches or tips of different shape and dimension according to different types of tests.

The first testing group 17 also comprises a first tightening device 80 arranged to block a portion of the film 100 of defined shape and area, in particular circular, on which the puncture test is performed i.e. to be perforated with the first punch 81 coming out from the testing drum 51.

The second testing group 18 comprises at least a pressure roller 82 arranged along one of the corners of the testing drum 51 for the whole height of the latter and connected with respective force sensors or load cells 89 able to measure a second retention or wrapping force exerted by the wrapped film around the testing drum 51 with an established number of wraps during the retention roller test.

The second testing group 18 can also comprise a couple of second punches 183 reversibly fixed to one of the four sides 53 of the testing drum 51 so as to be respectively oriented of 90° and 45° with respect to the aforesaid side 53. The second punches 183 simulate corners and tips of a load and verify the film 100 resistance to perforation while wrapping around the testing drum 45.

Figure 15:
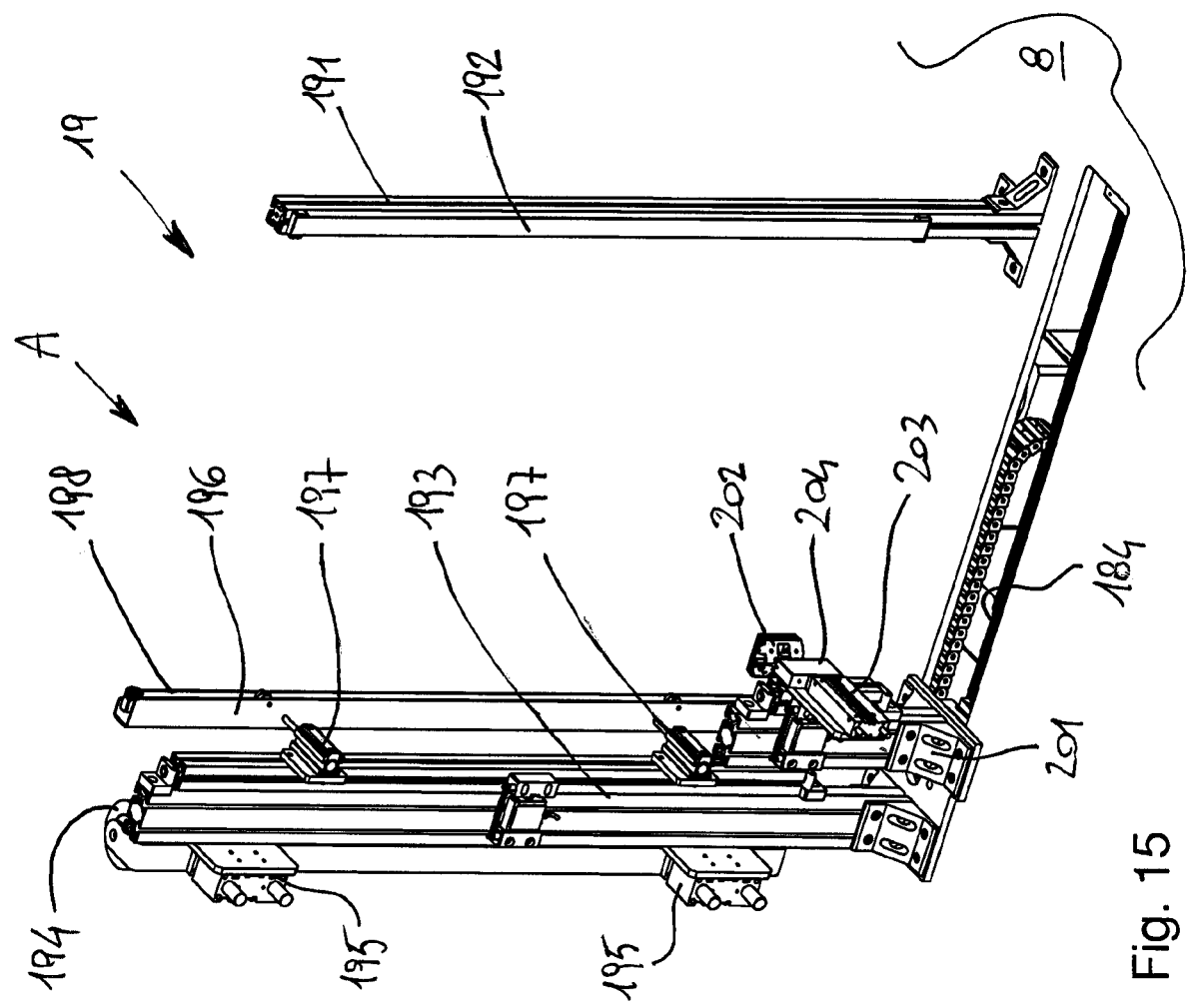
FIG. 15 is an enlarged perspective view of the third testing group of FIG. 13.
Figure 17:
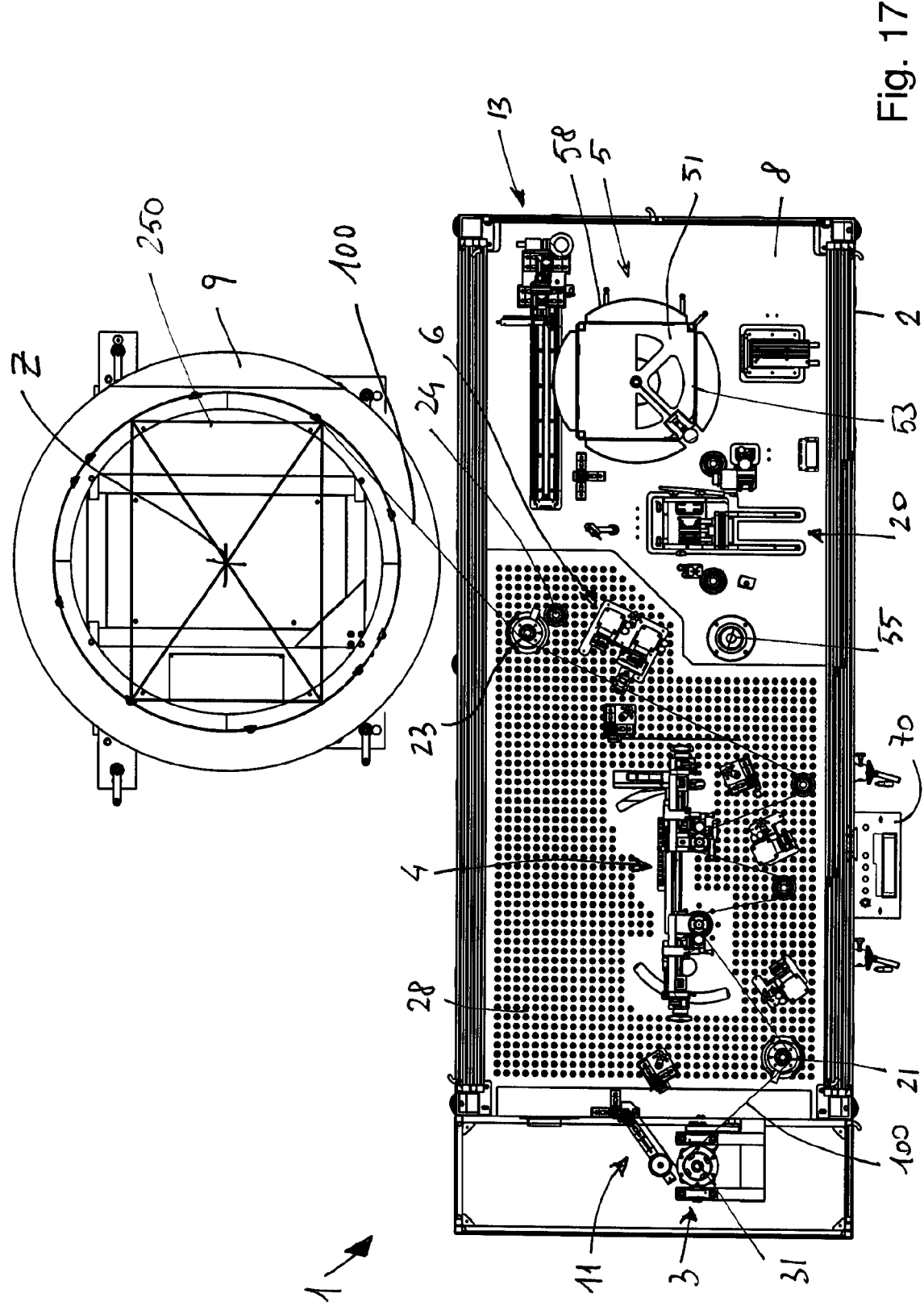
FIG. 17 is a plan view of a variant of the testing machine of the invention associated with an external rotating table for wrapping a load with a film to be tested.

Referring in particular to FIGS. 13 to 15, the third testing group 19 comprises a first abutment column 191 fixed to the supporting plane 8 between the fourth guiding roller 24 and the testing drum 51 and adjacent to the latter. The first abutment column 191 is provided with a magnetic hinge 192, that extends throughout its whole height and can be detached. The third testing group 19 further comprises a second abutment column 193 linearly movable along a guide 184 fixed to the supporting plane 8 and substantially parallel to a longitudinal side of the basic structure 2, between an operative position A, wherein said second abutment column 193 is spaced from the first abutment column 191, and an operative position B, wherein said second abutment column 193 is adjacent to said first abutment column 191. The second abutment column 193 is driven by a respective actuator, not shown, and supports rotatably a pressure roller 194 which extends longitudinally for the whole length of the second abutment column 193 and it can be moved in a direction orthogonal to the guide 184 moving closer to or further from the testing drum 51 by a pair of respective linear actuators 195. The second abutment column 193 further supports a return element 196 that extends for the whole height of the second abutment column 193 and it can be moved in a direction orthogonal to the guide 184 moving closer to or further from the magnetic hinge 192 (in the operative position B) by a pair of respective linear actuators 197. The abutment element 196 is provided with a cutting element 198 able to transversally cut the film 100 when the latter is locked between the magnetic hinge 194 and the abutment element 196 during the cling test. The cutting element 198 comprises, for example, a heated wire able to melt and section the plastic film 100. The length or height of the magnetic hinge 192, of the pressure roller 194 and of the abutment element 196 is greater than a maximum height or width of a film 100 to be tested.

The third testing group 19 is used also to perform detection of a friction coefficient (COF Test) of the film 100. To this end, the testing group 19 comprises a third abutment column 201 connected and in a single piece with the second abutment column 193 and linearly movable with the latter along the guide 184 between the non-operative position A and the operative position B. The third abutment column 201 supports a pad 202 that is movable in a direction orthogonal to the guide 184 moving closer to or further from the testing drum 51 by a second linear actuator 203. A respective force sensor or load cell 204 is interposed between the pad 202 and the second linear actuator 203 to measure a force exerted by the latter. The pad 202 can be removed to make it possible to apply a portion of the film to be tested (possibly pre-stretched) or any other type of material to perform several COF tests, as better explained in the hereinafter description.

The fourth testing group 20 (FIG. 16), placed on the supporting plane 8 between the testing drum 51 and the wrapping roller 55, and in particular between the two additional guiding rollers 25, comprises a second tightening device 85 arranged to block a portion of film of a definite shape and area, in particular circular, on which the dart test of the film 100 is performed and a pendulum system 86 provided with a second punch 87, so called dart, to simulate a dart falling on the film.

The pendulum 86 is rotated about an oscillating axis by means of a respective rotary electric motor 87. The latter during the test takes the pendulum 86 back to the initial raised position, varying the angle i.e., the drop height and thus the impact energy. Two sensors 88, for example of the inductive type, are provided behind the film 100 at an opposite side with respect to the pendulum 86 to measure the dart speed 87 after the breaking of the film 100. The fourth testing group 20 further comprises a cutting device 90 placed between the testing drum 51 and the pendulum system 86 and arranged to perform on the film 100 the test of resistance to tearing or incision (Tearing Test). The cutting device 90 comprises a blade (not shown in figures) moved by a third linear actuator 91 transversally, in particular almost orthogonally, to the film 100 to cut and perforate the latter. The blade and the third linear actuator 91 are mounted on a slide 92 slidably mounted on a sixth supporting column 93. The slide 92 is moved along the sixth supporting column 93 by a fourth actuator 94 such as to adjust a position or height of the blade with respect to the film 100. More precisely, the position of the blade can be adjusted according to a position of the lower longitudinal edge of the film 100 which position can vary as a result of the neck-in of the latter after pre-stretching.

At the fourth testing group 20 an elastic recovery test of the film 100 is also performed. The testing machine 1 of the invention allows to perform substantially automatically a plurality of measurements and tests on a plastic film 100 unwound from a reel 101 in order to determine the mechanical and physical properties for optimal use in packaging palletized loads. More precisely, the testing groups 17-20 make it possible to perform at least one of the incremental pre-stretching test until the breaking of the film (ultimate test), quality test, breaks/roll test, puncture test, retention test, retention roller test, elastic recovery test of the film 100, cling test, test for detecting the friction coefficient (COF test), tearing test and resilience test (Dart test). The testing machine 1 of the invention allows to rapidly and easily position the pre-stretching rollers 41, 42, return rollers 45, 46, 47 and guiding rollers 21, 24 to modify the unwinding path of the film and in particular the pre-stretching path. In particular, thanks to the main frame 40 of the pre-stretching station 4 comprising two rotatable portions 40a, 40b and supporting assemblies 48, 49, 50 it is possible to easily arrange the pre-stretching rollers 41, 42 and return rollers 45, 46 in a first operative configuration, to make an "S" wrapping path, or in a second operative configuration, to make a "W" wrapping path. The third return roller 47 is used in the second operative configuration of the pre-stretching station 4 to make the "W" pre-stretching path and can be fixed rapidly, reversibly and adjustably to the supporting plane 8 to vary such "W" wrapping path. Similarly, the first return roller 21 and the second return roller 22 are positioned by means of the mounting holes 28 to the supporting plane 8 to make the "S" wrapping path or the "W" wrapping path.

The processing and control unit 70 of the testing machine and the control software implemented therein make it possible to unwind and pre-stretch the film 100 to be tested with a "speed" or "torque" control of the pre-stretching rollers 41, 42 of the pre-stretching station 4.

In the "speed" control mode, the operator selects the rotation speed value of the second pre-stretching roller 42, which is the fast roller, the speed of the first pre-stretching roller 41, which is the slow roller, which is adjusted based on the selected value or percentage of elongation or pre-stretching and based on the speed of the second pre-stretching roller 42. In the "torque" control mode, in order to simulate most realistically what happens when a real load is wrapped, the operator sets an adjustment value of the wrapping force of the film on the load, and the processing and control unit 70 compares this adjustment value with the value of the force detected and measured by the load cell associated with the third guiding roller 23. The difference between the two force values (adjustment and measured) makes it possible to adjust the torque of the second fast pre-stretching roller 42. In order to keep the pre-stretching value constant (set by the operator), the speed of the first slow pre-stretching roller 41 is duly adjusted with respect to the speed of the fast roller.

Even the rotation of the unwinding roller 31 is adjusted based on the two different "speed" or "torque" control modes of the pre-stretching rollers 41, 42.

In the "torque" adjustment mode, i.e. with constant torque, the operator sets an adjustment value of the torque which must be maintained constant by the motor of the first driving system 32 during rotation of the unwinding roller 31.

In the "speed" adjustment mode, the motor of the first driving system 32 corrects its own speed such as to obtain an unwinding angle between reel and film that ensures the lack of elongation.

The testing drum 51 is rotated controlling its speed such that the peripheral speed of the film 100 wrapped thereon is substantially similar to the speed of the film coming out from the pre-stretching station 4 in order to avoid elongation or stretching of the film 100. The wrapping roller 55 is used to wrap the film 100 again during some tests (ultimate, quality, puncture Test). The wrapping roller 55 is controlled "speed" in order to wrap the film 100 with the same peripheral speed of the testing drum 51.

The testing machine 1 of the invention is able to automatically perform the incremental pre-stretching test until breaking of the film (Ultimate test). Such test allows to obtain correlation curves between the pre-stretching force Fp applied by the pre-stretching rollers 41, 42 and pre-stretching or elongation percentage εp of the film (pre-stretching being the ratio between film elongation—difference between the final length of the stretched film and the original length—and the original length multiplied by one hundred).

The test envisages that the film 100 is unwound from the reel 101, stretched by the pre-stretching rollers 41, 42 and wrapped again on the wrapping roller 55. The pre-stretching rollers 41, 42 and the unwinding roller 31 are controlled as regards speed, with the rotation speed Vp2 of the second fast pre-stretching roller 42 used as reference speed.

The film 100 pre-stretching εp is increased starting from 1% with a definite pitch until its breaking. The unwinding speed Vrs of the unwinding roller 31 is Vrs=0.97 Vp2 and the wrapping speed Vra of the wrapping roller 55 is Vra=0.98 Vp2. The values of the torques exerted by the motors of the first driving system 43, 44 on pre-stretching rollers 41, 42 are measured in a balanced state, with the constant pre-stretching value εp. Measurements are repeated for one second with a frequency of 1 kHz at maximum.

The average value of the pre-stretching force Fp applied to the film 100 by the two pre-stretching rollers is calculated and this value is related to the pre-stretching value εp.

The test is for example repeated four times for any type of drawing in of the film at different speeds (for example, 1, 2, 3, 4 m/s)

Four correlation curves Fp-εp, are obtained, one for each speed.

The processing and control unit 70 and the software also allow to calculate and produce correlation curves between Fp-A (Pre-stretching force-Elongation of the film); σ-ε (Stress-Strain); σr-ε (Real stress-Strain).

The testing machine 1 of the invention is able to perform automatically the quality test that allows to detect possible flaws and/or imperfections of the film 100.

The test envisages the film 100 to be unwound from the reel 101, stretched by the pre-stretching rollers 41, 42 with fixed pre-stretching and speed values selected by the operator and wrapped again on the wrapping roller 55. The viewing sensors 75 (first array photo cameras) of the fourth measuring group 14 detect possible flaws and/or imperfections of the film and the noisiness sensor or phonometer of the third measuring groups 13 detects the film 100 noisiness while being unwound.

The testing machine 1 of the invention is arranged to perform automatically the breaking test (Breaks/Roll test) which allows to detect the numbers of breaks of the film 100 with fixed pre-stretching values.

The test envisages the film 100 to be unwound from the reel 101, stretched by the pre-stretching rollers 41, 42 with fixed pre-stretching and speed values selected by the operator and wrapped again on the wrapping roller 55. The numbers of breaks are detected for different values of pre-stretching and unwinding of the film.

The testing machine 1 of the invention is able to perform automatically the puncture test which allows to detect and measure the force necessary to perforate the film.

The test envisages the film 100 to be unwound from the reel 101, stretched by the pre-stretching rollers 41, 42 with fixed pre-stretching and speed values selected by the operator and wrapped again on the wrapping roller 55 after moving on the testing drum 51. Once overcome the initial passage, the machine 1 slows down until it stops with the testing drum 51 in a predetermined position, in particular at the first tightening device 80 which blocks a portion of film of predefined shape and area which is perforated by the first punch 81 of the first testing group 17 protruding from a wall 53 of the testing drum 51. The load cell 182 interposed between the first punch 81 and the first actuator 181 measures the force needed for perforation.

Perforation is performed on just one layer of film 100 present on the testing drum 51.

The testing machine 1 of the invention is arranged to perform automatically the retention test by means of which the force exerted over time by the film wrapped on the testing drum 51 after being pre-stretched is measured.

The test envisages the film 100 to be unwound from the reel 101, stretched by the pre-stretching rollers 41, 42 with fixed pre-stretching and speed values selected by the operator and wrapped again on the wrapping roller 55 after moving on the testing drum 51. Once the initial passage is overcome, the machine 1 slows down until it stops with the testing drum 51 in a predetermined position wherein the first punch 81 of the first testing group 17 protrudes from a wall 53 of the testing drum 51 of a quantity defined by the operator and stretches the layer of film 100. The load cell 182 interposed between the first punch 81 and the first actuator 181 measures the force exerted by the film 100 on the first punch 81 for a time set by the operator.

The testing machine 1 of the invention allows to perform automatically the retention roller test by means of which the force exerted over time by the film wrapped on the testing drum 51 after being pre-stretched is measured.

In this test, the film 100 is unwound from the reel 101, stretched by the pre-stretching rollers 41, 42 with fixed pre-stretching and speed values selected by the operator and wrapped again on the wrapping roller 55 after moving on the testing drum 51. The four semi-circular elements 53 are removed from the testing drum 51 in the same way as a real pallet with square-shaped plan section. Once wrapping is over, with a number of wraps set by the operator, the wrapping force exerted by the film 100 wrapped about the testing drum 51 (second containment force) is detected, in a selected period of time, by the respective load cells 89 of the pressure roller 82 of the second testing group 18.

The testing machine 1 of the invention allows to perform semi-automatically the cling test which makes it possible to measure the force needed to detach by peeling a portion of film from the underlying layer of film with different pre-stretching values.

The test envisages the film 100 to be unwound from the reel 101, stretched by the pre-stretching rollers 41, 42 with fixed pre-stretching and speed values selected by the operator and wrapped on the wrapping roller 51. The film 100 is manually blocked on the testing drum 51, so the second abutment column 193 of the third testing group 19 is moved from the non operative position A to the operative position B along the guide 184. In the displacement, the pressure roller 194 pushed towards the testing drum 51 by respective linear actuators 195 presses the film 100 against the testing drum 51, in particular to make the more external layer adhere to the underlying film. In the operative position B the abutment element 196 is moved in a direction orthogonal to the guide 184 such as to abut against the magnetic hinge 192 and block the film 100 against it. The latter is thus cut upwards of the magnetic hinge 192 by the cutting element 198 which generates two flaps of film, the downstream one of which, referring to the path of unwinding the film, is held and blocked by the magnetic hinge 192 which adheres to the abutment element 196.

At this point the second abutment column 193 is moved backwards in the non-operative position A. The magnetic hinge 192 stays engaged with the abutment element 196 thus blocking the flap downstream of the film which is progressively detached during the backward movement of the second abutment column 193 from the underlying layer of film 100 wrapped on the testing drum 51. The force necessary to move the second abutment column 193 along the guide is measured and corresponds to the adhesion force of the film 100.

The testing machine 1 of the invention makes it possible to perform in a semi-automatic way the test of detecting the friction coefficient (COF test) for example between two pre-stretched films put in contact.

The test envisages the film 100 to be unwound from the reel 101, stretched by the pre-stretching rollers 41, 42 with fixed pre-stretching and speed values selected by the operator and wrapped on the wrapping roller 51. The film 100 is blocked on the testing drum 51. A portion of the pre-stretched film 100 itself (for example manually taken from the testing drum 51) or of another material, is applied to the pad 202 of the third testing group 19. The pad 202 is thus moved by the second linear actuator 203 such as to abut with a definite compression force, measured by the respective load cell 204, against a side 53 of the testing drum 51 on which the film 100 is wrapped. At this point, the third abutment column 201 (with the second abutment column 193) is linearly moved along the guide 184 from the non-operative position A to the operative position B such as to make the film or any other material positioned on the pad 202 rub on the film 100 wrapped on the testing drum 51. The force necessary to move the third abutment column 201 along the guide 184 is measured and allows to move up and calculate a friction coefficient between film/material positioned on the buffer and film wrapped on the testing drum 51.

The testing machine 1 of the invention allows to perform semi-automatically the tearing test by means of which it is possible to measure the force necessary to tear the film 100 after having made a cut on it.

During the test the film 100 is unwound from the reel 101, stretched by the pre-stretching rollers 41, 42 with fixed pre-stretching and speed values selected by the operator and wrapped again on the wrapping roller 55 after moving on the testing drum 51. Once the initial passage is overcome, the machine 1 slows down until it stops. The film 100 is manually blocked on the testing drum 51 and the cutting device 90 performs thereon a vertical cut of predefined length. The vertical height or position of the blade is previously adjusted by the processing and control unit 70 moving the slide 92 along the sixth supporting column 93 based on the lower longitudinal edge of the film 100 detected by the second viewing sensor 175 of the sixth measuring group 18 and sent to the processing and control unit 70.

The testing drum 51 is kept blocked by the respective brake of the electric motor of the third driving system 52 while the wrapping roller 55 is rotated by the motor of the fourth driving system 56 submitting the film 100 to a pulling force which increases until the value of complete break of the film 100.

The testing machine 1 of the invention allows to perform automatically the elastic recovery test of film 100 by means of which it is possible to measure the elastic elongation of the film 100 submitted to a constant force.

The test envisages the film 100 to be unwound from the reel 101, stretched by the pre-stretching rollers 41, 42 with fixed pre-stretching and speed values selected by the operator and wrapped again on the wrapping roller 55 after moving on the testing drum 51. The film 100 is manually blocked on the testing drum 51 which is kept blocked by the brake of the electric motor of the third driving system 52 while the wrapping roller 55 is rotated by the motor of the fourth driving system 56 submitting the film 100 to a constant and predefined pulling force which is kept for a definite period of time. The rotation angle of the wrapping roller 55 is measured and the elastic elongation of the film 100 is calculated.

The testing machine 1 of the invention allows to perform semi-automatically the dart test by means of which it is possible to measure the resilience of the film 100 by means of a dart connected to a pendulum.

During the test the film 100 is unwound from the reel 101, stretched by the pre-stretching rollers 41, 42 with fixed pre-stretching and speed values selected by the operator and wrapped again on the wrapping roller 55 after moving on the testing drum 51. Once the initial passage is overcome, the machine 1 slows down until it stops and the film 100 is blocked by the second locking device 85 of the fourth testing group 20, positioned between the testing drum 51 and the wrapping roller 55. The pendulum 86 with the dart 87 is rotated in the initial predefined position and is released such as to hit the film 100 at the portion blocked by the second locking device 85. The test is repeated gradually increasing the drop height of the pendulum 86 until the film breaks. The two sensors 88 of the fourth testing group 20 provided behind the film 100 opposite to the pendulum 86 measure the dart speed 87 after breaking of the film 100 indicative of the film 100 resilience.

Thanks to the testing machine of the invention it is therefore possible to perform on extensible plastic films, completely automatically, a plurality of measurements and tests which are generally performed manually and/or with different and separated machinery and tools. In particular, with the testing machine 1 it is possible to measure, with no intervention by the operator, height or strip width of the film 100, i.e., width neck-in of the film, and thicknesses of the latter before and after pre-stretching, detect the presence of possible flaws and/or imperfections on the film, measure a level of noise generated by the machine while unwinding the film. The testing machine 1 further allows to perform automatically the incremental pre-stretching test until breaking of the film (ultimate test), the quality test, the breaks/roll test, the puncture test, the retention test, the retention roller test and the elastic recovery test of the film 100.

It is also possible to perform semi-automatically, with little intervention by the operator, the cling test, the test of detecting the friction coefficient (COF test), the tearing test and the dart test.

The testing machine 1 of the invention is also particularly compact, small-sized and cheap and it makes it possible to perform precise and accurate measurements and tests on the film, and to collect, process and store relative data.

FIG. 15 illustrates a variant of the testing machine 1 of the invention which differs from the previously described embodiment in that it comprises a table 9 positioned externally and adjacent to the basic structure 2, arranged to receive and support a palletized load or provided with a model 250, which simulates a palletized load, as shown in the figure, said table 9 being drivable in rotation about a wrapping axis Z, in particular almost vertical, in order to wrap said load or said profile with the film 100 coming from the pre-stretching station 4.

The invention claimed is:

1. A testing machine to perform a plurality of measurements and tests on a film made of plastic in order to determine mechanical and physical properties of the film, the testing machine comprising:
 a basic structure that is provided with a supporting plane;
 an unwinding station that is supported by said supporting plane and provided with an unwinding roller that is driven and/or controlled in rotation about a respective longitudinal axis by a first driving system and is arranged to support a reel of the film;
 a pre-stretching station that is supported by said supporting plane and arranged to unwind the film from the reel with a preset unwinding speed and to pre-stretch the film at a preset percentage, wherein said pre-stretching station comprises a plurality of pre-stretching rollers that are driven in rotation about respective longitudinal axes by a second driving system and a plurality of return rollers to deviate and wrap the film on said pre-stretching rollers according to a predetermined pre-stretching path, and wherein said pre-stretching rollers and said return rollers are interchangeable, and adjustably positionable to change the pre-stretching path;
 a wrapping station that is supported by said supporting plane and provided with a testing drum that is driven and/or controlled in rotation about a respective longitudinal axis by a third driving system and arranged to be wrapped at least partially by the film coming out from said pre-stretching station;
 a plurality of guiding rollers to lead the film along an unwinding path from said unwinding station to said pre-stretching station and from said pre-stretching station to said wrapping station, wherein said guiding rollers are interchangeable and reversibly and adjustably mountable to said supporting plane to change the unwinding path;
 a plurality of measuring groups to perform a plurality of respective measurements at least of dimensional and/or physical parameters of the reel and of the film and reversibly and adjustably mountable to said supporting plane depending on the unwinding path; and
 a plurality of testing groups that are provided with respective devices arranged to interact with the film to perform respective tests and measurements on the film in order to determine mechanical and physical properties of the film.

2. The testing machine according to claim 1, wherein said supporting plane comprises a plurality of mounting holes that are mutually spaced to reversibly and adjustably mount said guiding rollers and said measuring groups.

3. The testing machine according to claim 2, wherein said pre-stretching station further comprises a main frame that is connected to said supporting plane and supports rotatably and removably a first pre-stretching roller of said plurality of pre-stretching rollers, and rotatably, removably and adjustably in position a second pre-stretching roller of said plurality of pre-stretching rollers, a first return roller of said plurality of return rollers, and a second return roller of said plurality of return rollers.

4. The testing machine according to claim 2, wherein said wrapping station comprises a wrapping roller that is driven and/or controlled in rotation about a respective longitudinal axis by a fourth driving system and is arranged to receive and be wrapped by the film coming out from said testing drum.

5. The testing machine according to claim 2, further comprising a film neck-in group that is placed between said pre-stretching station and said wrapping station and arranged to shrink a width of the film and/or roll at least one longitudinal edge of the film, wherein said film neck-in group is reversibly and adjustably mountable on said supporting plane depending on the unwinding path.

6. The testing machine according to claim 2, wherein said plurality of measuring groups comprises a first measuring group to measure a length of the film that is unwound from the reel and/or a diameter of the reel.

7. The testing machine according to claim 2, wherein said plurality of measuring groups comprises a second measuring group that is arranged to measure a weight of the reel of film and/or an angle formed by the film unwound from the reel with a vertical plane passing through longitudinal axes respectively of the reel and of a first guiding roller of said plurality of guiding rollers that is placed between said unwinding station and said pre-stretching station.

8. The testing machine according to claim 2, wherein said plurality of measuring groups comprises a third measuring group that is arranged to measure a level of noise generated while unwinding the film.

9. The testing machine according to claim 2, wherein said plurality of measuring groups comprises a fourth measuring group that is arranged to measure a width of the film and/or a width neck-in of the film and/or a thickness of the film coming out from said unwinding station and before said pre-stretching station.

10. The testing machine according to claim 2, wherein said plurality of measuring groups comprises a fifth measuring group that is arranged to measure a thickness of the film coming out from said pre-stretching station.

11. The testing machine according to claim 2, wherein said plurality of measuring groups comprises a sixth measuring group that is arranged to measure a width neck-in of the film and/or detect flaws and/or imperfections of the film coming out from said pre-stretching station.

12. The testing machine according to claim 2, wherein said plurality of testing groups comprises a first testing group to perform a puncture test on the film and/or a measurement of a first retention force of the film wrapped on said testing drum.

13. The testing machine according to claim 2, wherein said plurality of testing groups comprises a second testing group to perform a measurement of a second retention force of the film wrapped on said testing drum.

14. The testing machine according to claim 2, wherein said plurality of testing groups comprises a third testing group that is arranged at said testing drum to perform on the film a cling test and/or a friction coefficient test.

15. The testing machine according to claim 2, wherein said plurality of testing groups comprises a fourth testing group that is arranged adjacent to said testing drum and is arranged to perform on the film a test of resistance to tearing and/or an test for detecting elastic recovery of the film and/or a dart test of the film.

16. The testing machine according to claim 2, further comprising a table that is positioned externally and adjacent to said basic structure and is arranged to receive and support a palletized load or is provided with a model that simulates a palletized load, wherein said table is drivable in rotation about a wrapping axis in order to wrap the palletized load or the model with the film coming from said pre-stretching station.

17. The testing machine according to claim 1, wherein said pre-stretching station further comprises a main frame that is connected to said supporting plane and supports rotatably and removably a first pre-stretching roller of said plurality of pre-stretching rollers, and rotatably, removably and adjustably in position a second pre-stretching roller of said plurality of pre-stretching rollers, a first return roller of said plurality of return rollers, and a second return roller of said plurality of return rollers.

18. The testing machine according to claim 17,
wherein said main frame comprises a first portion that supports said second pre-stretching roller and said second return roller, and a second portion that supports said first return roller, and
wherein said first portion and said second portion are rotatable about an adjusting axis, which coincides with a rotation axis of said first pre-stretching roller, to adjust an angular position of said second pre-stretching roller and of said first and second return rollers with reference to said first pre-stretching roller.

19. The testing machine according to claim 18,
wherein said first portion comprises a first supporting assembly to rotatably and removably support said second pre-stretching roller and linearly movable to adjust a position of said second pre-stretching roller with reference to said first pre-stretching roller, and a second supporting assembly to rotatably and removably support said second return roller and linearly movable to adjust a position of said second return roller with reference to said second pre-stretching roller, and
wherein said second portion comprises a third supporting assembly to rotatably and removably support said first return roller and linearly movable to adjust a position of said first return roller with reference to said first pre-stretching roller.

20. The testing machine according to claim 1, wherein said wrapping station comprises a wrapping roller that is driven and/or controlled in rotation about a respective longitudinal axis by a fourth driving system and is arranged to receive and be wrapped by the film coming out from said testing drum.

21. The testing machine according to claim 1, further comprising a film neck-in group that is placed between said pre-stretching station and said wrapping station and arranged to shrink a width of the film and/or roll at least one longitudinal edge of the film, wherein said film neck-in group is reversibly and adjustably mountable on said supporting plane depending on the unwinding path.

22. The testing machine according to claim 1, wherein said plurality of measuring groups comprises a first measuring group to measure a length of the film that is unwound from the reel and/or a diameter of the reel.

23. The testing machine according to claim 1, wherein said plurality of measuring groups comprises a second measuring group that is arranged to measure a weight of the reel of film and/or an angle formed by the film unwound from the reel with a vertical plane passing through longitudinal axes respectively of the reel and of a first guiding roller of said plurality of guiding rollers that is placed between said unwinding station and said pre-stretching station.

24. The testing machine according to claim 1, wherein said plurality of measuring groups comprises a third measuring group that is arranged to measure a level of noise generated while unwinding the film.

25. The testing machine according to claim 1, wherein said plurality of measuring groups comprises a fourth measuring group that is arranged to measure a width of the film and/or a width neck-in of the film and/or a thickness of the film coming out from said unwinding station and before said pre-stretching station.

26. The testing machine according to claim 1, wherein said plurality of measuring groups comprises a fifth measuring group that is arranged to measure a thickness of the film coming out from said pre-stretching station.

27. The testing machine according to claim 1, wherein said plurality of measuring groups comprises a sixth measuring group that is arranged to measure a width neck-in of the film and/or detect flaws and/or imperfections of the film coming out from said pre-stretching station.

28. The testing machine according to claim 1, wherein said plurality of testing groups comprises a first testing group to perform a puncture test on the film and/or a measurement of a first retention force of the film wrapped on said testing drum.

29. The testing machine according to claim 1, wherein said plurality of testing groups comprises a second testing group to perform a measurement of a second retention force of the film wrapped on said testing drum.

30. The testing machine according to claim 1, wherein said plurality of testing groups comprises a third testing group that is arranged at said testing drum to perform on the film a cling test and/or a friction coefficient test.

31. The testing machine according to claim 1, wherein said plurality of testing groups comprises a fourth testing group that is arranged adjacent to said testing drum and is arranged to perform on the film a test of resistance to tearing and/or an test for detecting elastic recovery of the film and/or a dart test of the film.

32. The testing machine according to claim 1, further comprising a table that is positioned externally and adjacent to said basic structure and is arranged to receive and support a palletized load or is provided with a model that simulates a palletized load, wherein said table is drivable in rotation about a wrapping axis in order to wrap the palletized load or the model with the film coming from said pre-stretching station.

* * * * *